United States Patent
Neshev et al.

(10) Patent No.: US 11,137,663 B2
(45) Date of Patent: Oct. 5, 2021

(54) FREQUENCY CONVERSION DEVICE AND PROCESS

(71) Applicant: The Australian National University, Acton (AU)

(72) Inventors: Dragomir N. Neshev, Downer (AU); Mohsen Rahmani, Lyneham (AU); Hark Hoe Tan, Garran (AU); Chennupati Jagadish, O'Connor (AU); Yuri Kivshar, Florey (AU); Fouad Karouta, Ainslie (AU); Alexander Solntsev, Waitara (AU); Lei Xu, Braddon (AU); Giuseppe Marino, Paris (FR); Andrey Sukhorukov, Macquarie (AU)

(73) Assignee: The Australian National University, Australian Capital Territory (AU)

( * ) Notice: Subject to any disclaimer, the term of this patent is extended or adjusted under 35 U.S.C. 154(b) by 0 days.

(21) Appl. No.: 16/612,714

(22) PCT Filed: May 11, 2018

(86) PCT No.: PCT/AU2018/050448
§ 371 (c)(1),
(2) Date: Nov. 11, 2019

(87) PCT Pub. No.: WO2018/204991
PCT Pub. Date: Nov. 15, 2018

(65) Prior Publication Data
US 2020/0209708 A1    Jul. 2, 2020

(30) Foreign Application Priority Data
May 12, 2017 (AU) .............................. 2017901782

(51) Int. Cl.
*G02F 1/35* (2006.01)
*G02F 1/355* (2006.01)

(52) U.S. Cl.
CPC .......... *G02F 1/3534* (2013.01); *G02F 1/3556* (2013.01); *G02F 2203/11* (2013.01)

(58) Field of Classification Search
CPC .......... G02F 1/35; G02F 1/353; G02F 1/3534; G02F 1/3556; G02F 1/37; G02F 2203/11
See application file for complete search history.

(56) References Cited

U.S. PATENT DOCUMENTS

| 5,113,473 A | 5/1992 | Yoshida |
| 5,543,354 A | 8/1996 | Richard |

(Continued)

FOREIGN PATENT DOCUMENTS

| JP | 03028831 A | 2/1991 |
| WO | WO 2008/046147 A1 | 4/2008 |

OTHER PUBLICATIONS

Hugonin et al., "RETICOLO Code for the diffraction by stacks of lamellar gratings"; Institut d'Optique; Orsay, France; 2005 (updated 2013); 56 pages.

(Continued)

*Primary Examiner* — Daniel Petkovsek
(74) *Attorney, Agent, or Firm* — Knobbe, Martens, Olson & Bear, LLP

(57) ABSTRACT

A frequency conversion device, including a source of a pump beam of electromagnetic radiation of a first wavelength, and an array of mutually spaced semiconductor islands including at least one III-V semiconductor compound and configured so that the pump beam of electromagnetic radiation of the first wavelength incident upon the semiconductor islands and electromagnetic radiation of a second wavelength incident upon the semiconductor islands (Continued)

cause the semiconductor islands to emit electromagnetic radiation of a third wavelength different to the first and second wavelengths by at least one of a sum frequency generation process and a difference frequency generation process, wherein the semiconductor islands are supported by a transparent support such that the support is substantially transparent to radiation of the third wavelength, wherein at least the radiation of the third wavelength passes through the transparent support.

27 Claims, 40 Drawing Sheets

(56) References Cited

U.S. PATENT DOCUMENTS

| | | | |
|---|---|---|---|
| 6,528,339 B1 | 3/2003 | Goldstein | |
| 6,541,788 B2 | 4/2003 | Petroff | |
| 6,751,243 B2 | 6/2004 | Mukai | |
| 6,958,853 B1 | 10/2005 | Arnone | |
| 6,995,371 B2 | 2/2006 | Garber | |
| 7,560,707 B2 * | 7/2009 | Bratkovski | B82Y 20/00 250/458.1 |
| 10,054,839 B1 * | 8/2018 | Brener | G02F 1/353 |
| 10,698,293 B2 * | 6/2020 | Rahmani | G02F 1/3556 |
| 2002/0162995 A1 | 11/2002 | Petroff et al. | |
| 2008/0258079 A1 | 10/2008 | Bratkovski | |
| 2011/0002574 A1 | 1/2011 | Bermel | |
| 2015/0369989 A1 | 12/2015 | Hsu | |
| 2017/0309797 A1 | 10/2017 | De Boer | |

OTHER PUBLICATIONS

Bakker et al., "Resonant Light Guiding Along a Chain of Silicon Nanoparticles", Nano Letters DOI: 10.1021/acs.nanolett.7b00381 (2017).
Camacho-Morales, R., et al., "Nonlinear generation of vector beams from AlGaAs nanoantennas", Nano Letters 16, p. 2791-7197 (2016).
Marino, G., et al., "Sum-Frequency Generation and Photon-Pair Creation in AlGaAs Nano-Scale Resonators", CLEO: QELS_Fundamental Science Conference Proceedings, May 14-19, 2017. <url: https://doi.org/10.1364/CLEO_QELS.2017.FTu4D.2 >.
Pendry et al., "Calculation of photon dispersion relations", Physical Review Letters 69, 2772-2775 (1992).
Randall, I., "Semiconductor discs could boost night vision", Physics World. Published online: Jan. 5, 2017. <url: https://physicsworld.com/a/semiconductordiscs-could-boost-night-vision/ >.
Savelev et al., "Bending of electromagnetic waves in all-dielectric particle array waveguides" Applied Physics Letters 105, 181116 (2014).
Zhang, X., et al., "Sum frequency generation in pure zinc-blend GaAs nanowires", Optics Express 21, 28432 (2013).
International Search Report, Australian Patent Office, International Application No. PCT/AU2018/050448, Filed May 11, 2018, ISR dated Oct. 18, 2018.
IPRP, International Application No. PCT/AU2018/050448, dated May 8, 2019.
Extended European Search Report in EP 18798715.1 dated Dec. 22, 2020 in 9 pages.

* cited by examiner

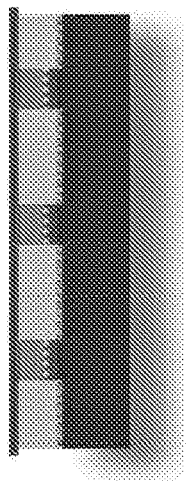
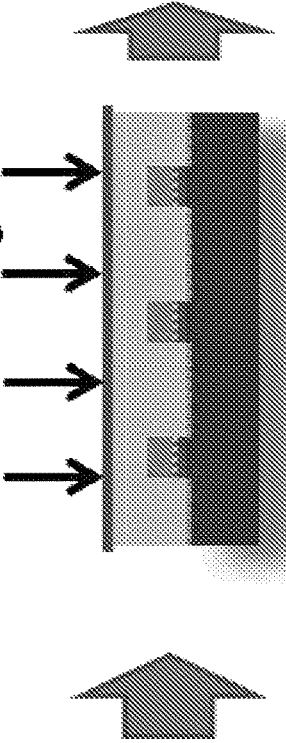
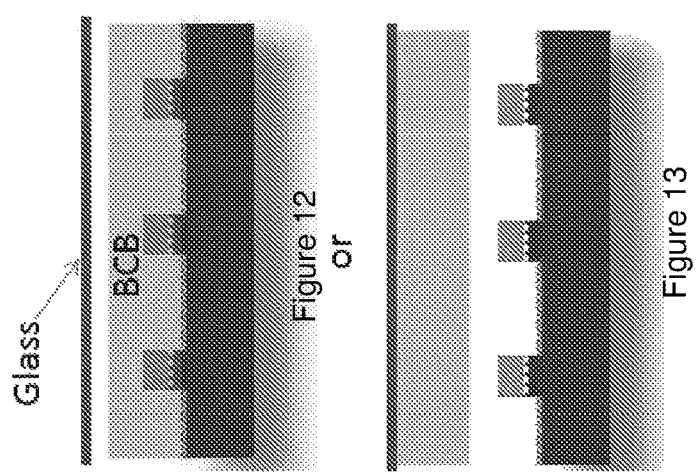
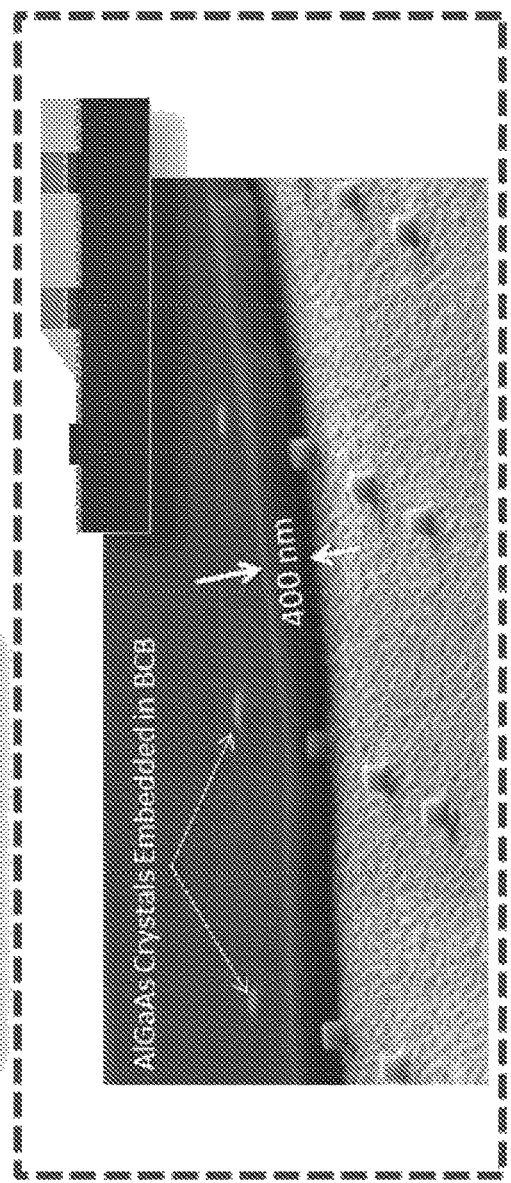

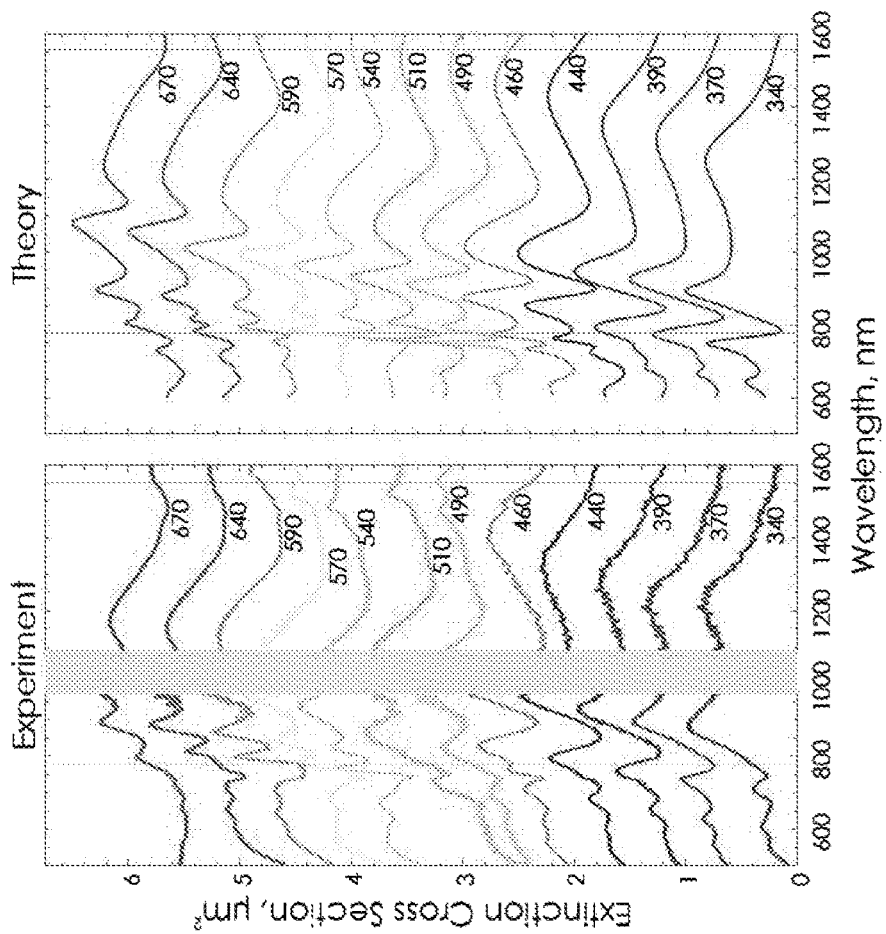
Figure 22
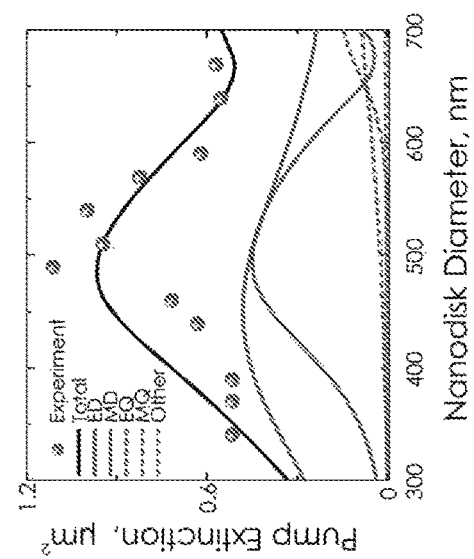
Figure 21
Figure 23

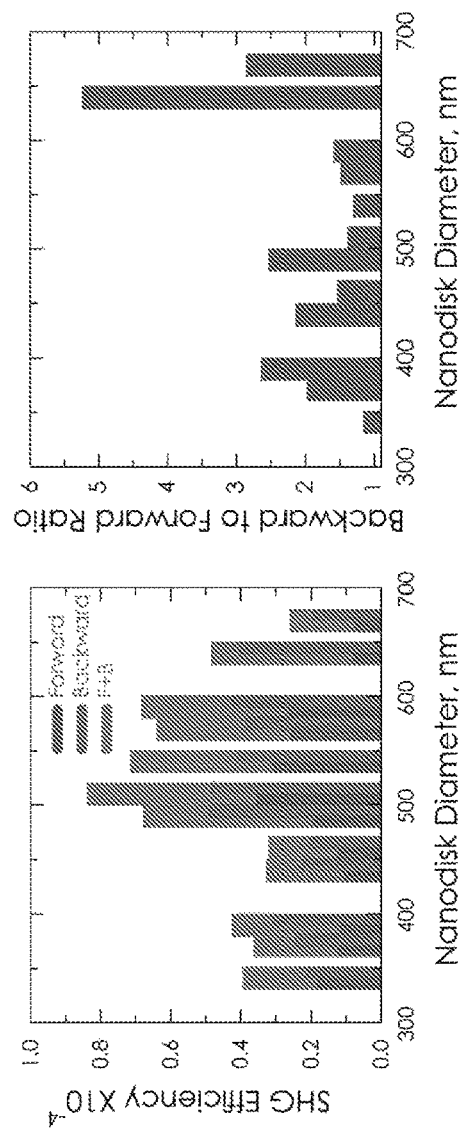
Figure 26
Figure 25
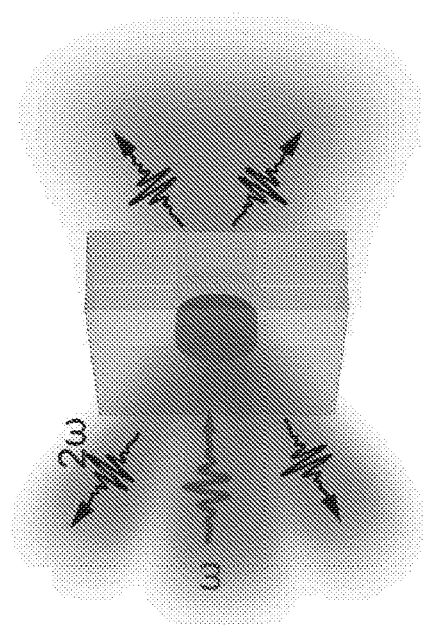
Figure 24

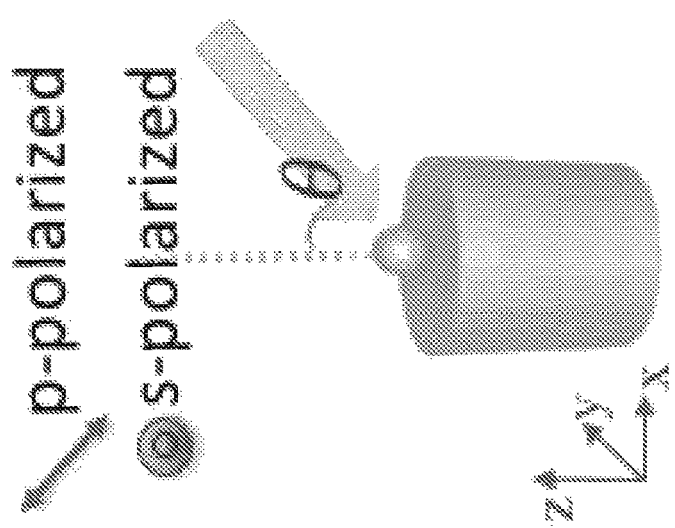
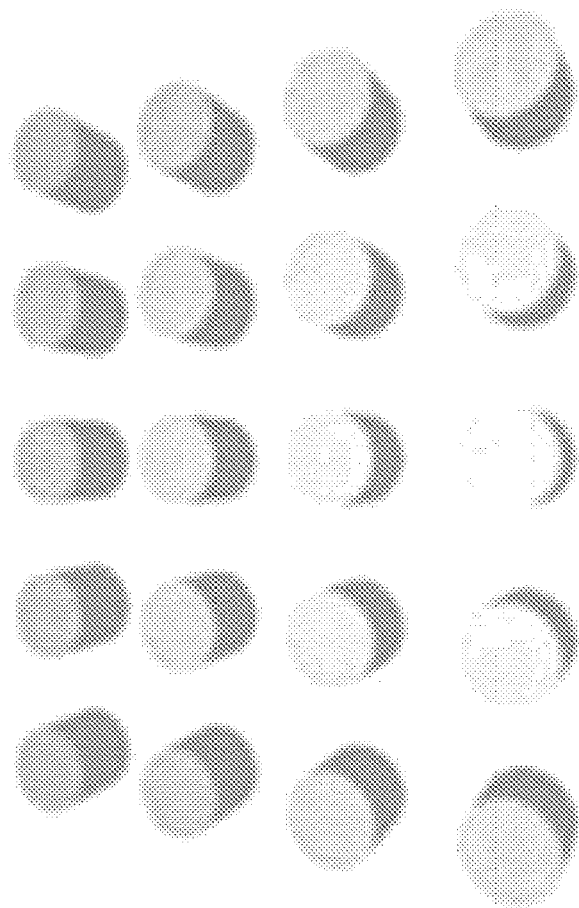
Figure 51

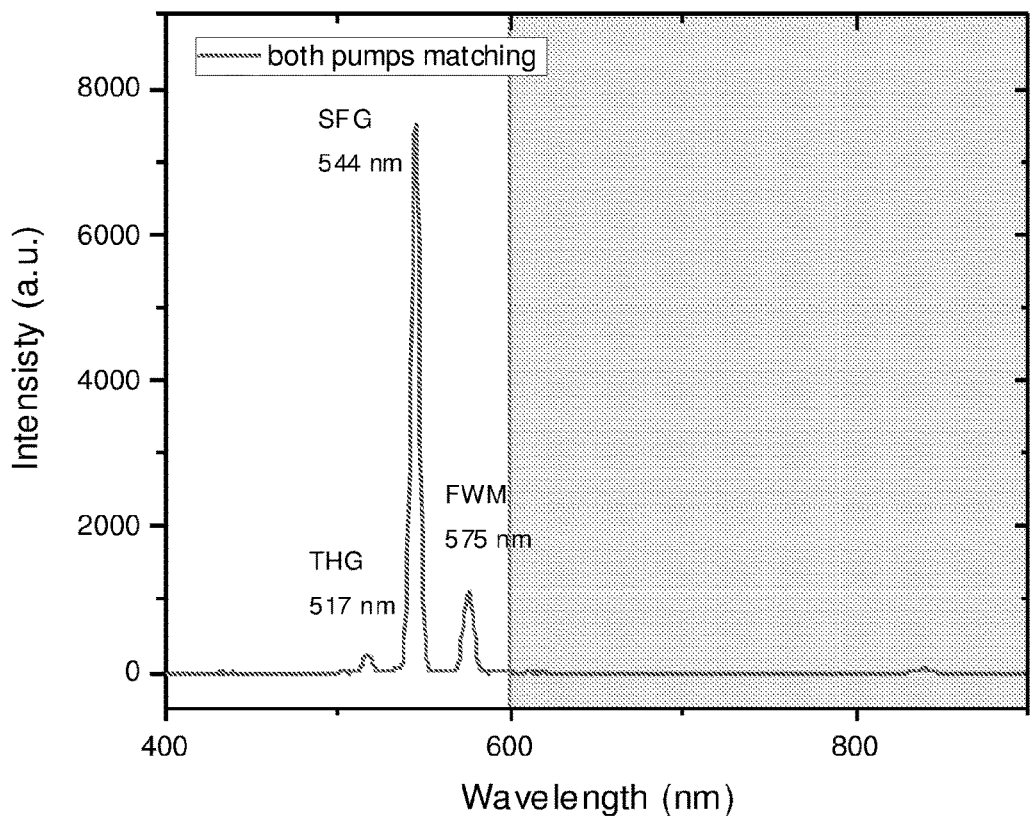
Figure 65
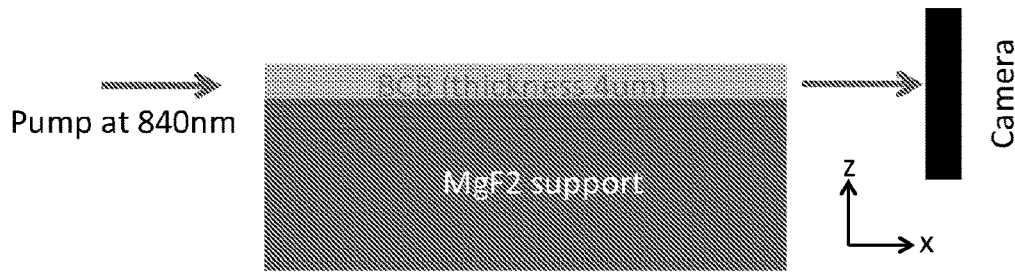
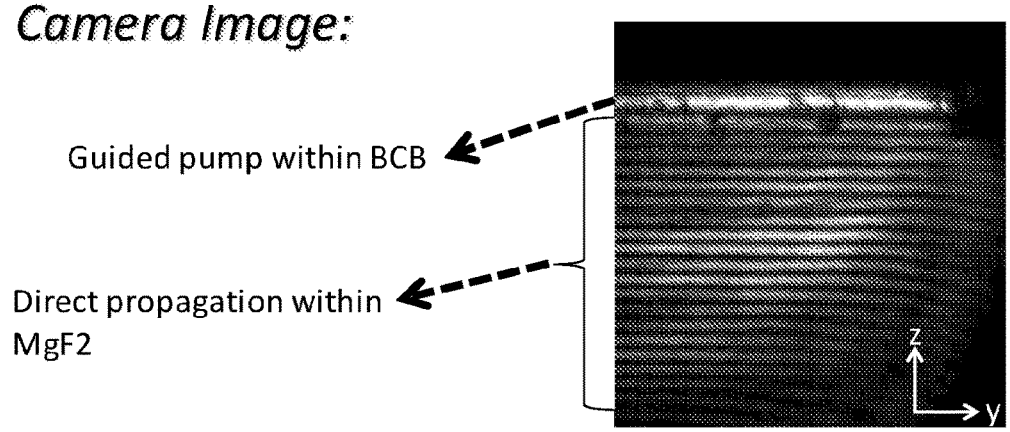
Figure 66

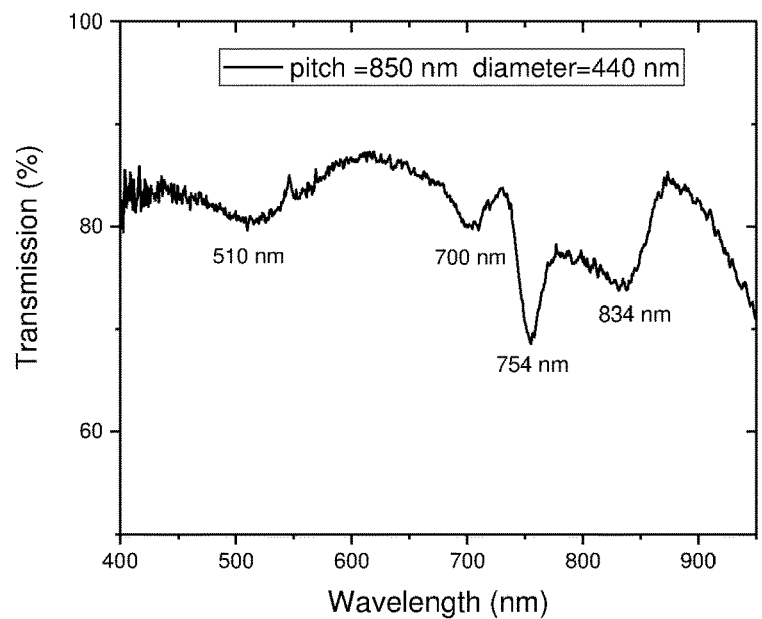
Figure 67
Optical Microscope
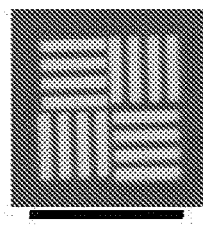
25 μm
SFG via both pumps (matching condition)
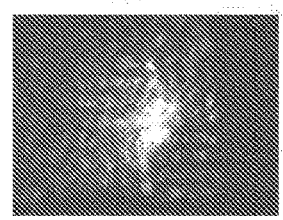
Only 840 (pump)
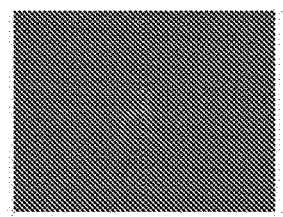
Only 1550 (signal)
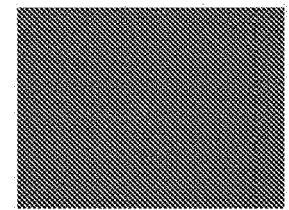
Figure 68

FREQUENCY CONVERSION DEVICE AND PROCESS

CROSS-REFERENCE TO RELATED APPLICATIONS

This application is the U.S. National Phase under 35 U.S.C. § 371 of International Application No. PCT/AU2018/050448, filed May 11, 2018, designating the United States and published in English on Nov. 15, 2018, as WO 2018/204991, which claims priority to Australian Application No. 2017901782, filed May 12, 2017.

TECHNICAL FIELD

The present invention relates to non-linear frequency/wavelength conversion of non-ionising electromagnetic radiation, and in particular to a frequency conversion device (such as a thermal imaging or night vision device, for example), a frequency conversion process, and a process for producing a frequency conversion device.

BACKGROUND

There are many applications that require or at least benefit from the conversion of non-ionising electromagnetic radiation from one frequency/wavelength to a different frequency/wavelength, including imaging and detection applications. For example, night vision and thermal imaging devices are able to generate images in the visible light region from ambient or artificial radiation in the infrared region. However, despite the advantageous capabilities of existing frequency/wavelength conversion devices, there remains room for improvement in terms of their performance and also, in the case of night vision equipment, their bulkiness. It is desired, therefore, to overcome or alleviate one or more difficulties of the prior art, or to at least provide a useful alternative.

SUMMARY

In accordance with some embodiments of the present invention, there is provided a frequency conversion device, including a source of a pump beam of electromagnetic radiation of a first wavelength, and an array of mutually spaced semiconductor islands composed of at least one III-V semiconductor compound and configured so that the pump beam of electromagnetic radiation of the first wavelength incident upon the semiconductor islands and electromagnetic radiation of a second wavelength incident upon the semiconductor islands cause the semiconductor islands to emit electromagnetic radiation of a third wavelength different to the first and second wavelengths by at least one of a sum frequency generation process and a difference frequency generation process;
wherein the semiconductor islands are supported by a transparent support such that the support is substantially transparent to radiation of the third wavelength, wherein at least the radiation of the third wavelength passes through the transparent support.

In some embodiments, the electromagnetic radiation of the second wavelength is infrared radiation, and the radiation of the third wavelength is visible light.

In some embodiments, the pump beam is directed along a plane containing the array of semiconductor islands. In some embodiments, the frequency conversion device includes a waveguide structure to confine the pump beam within the plane containing the array of semiconductor islands.

In some embodiments, a portion of the pump beam is transmitted through the array of semiconductor islands, and the frequency conversion device includes a filter to remove the portion and to pass the electromagnetic radiation of the third wavelength.

In some embodiments, the frequency conversion device is transparent to visible light to enable vision through the frequency conversion device.

In some embodiments, the semiconductor islands are configured such that the electromagnetic radiation of a third wavelength is predominantly emitted in a forward direction.

In some embodiments, the semiconductor islands include groups of semiconductor islands configured to resonate at respective different frequencies such that the pump beam of electromagnetic radiation of the first wavelength incident upon the semiconductor islands and electromagnetic radiation of different second wavelengths incident upon the semiconductor islands cause them to emit electromagnetic radiation of respective third wavelengths different to the respective second wavelengths by at least one of a sum frequency generation process and a difference frequency generation process.

In some embodiments, the second wavelengths are in an infrared region of the electromagnetic spectrum, and the third wavelengths are in a visible region of the electromagnetic spectrum such that the different second wavelengths incident upon the groups of semiconductor islands cause them to emit visible light of respective different colours.

In some embodiments, the semiconductor islands are at least partially embedded in the transparent support.

In some embodiments, the transparent support includes a transparent substrate attached to a layer of a transparent material in which the semiconductor islands are at least partially embedded.

In some embodiments, the transparent substrate and the transparent material are both substantially transparent to radiation of the first wavelength and to radiation of the second wavelength and to radiation of the third wavelength.

In some embodiments, the refractive index of the transparent substrate is equal to or approximately equal to the refractive index of the transparent material.

In some embodiments, the refractive index of the transparent substrate is different to the refractive index of the transparent material.

In some embodiments, the transparent substrate is a glass or $MgF_2$ or $BaF_2$ and the transparent material is a polymer.

In some embodiments, the semiconductor islands are in the form of cylinders with diameters and/or heights of the order of hundreds of nm.

In some embodiments, the signal radiation of a second wavelength is reflected from or is otherwise emitted from one or more objects, and the frequency conversion device includes focusing elements configured to focus at least the radiation of a third wavelength to form a two-dimensional image of the one or more objects.

In accordance with some embodiments of the present invention, there is provided a night vision device including any one of the above frequency conversion devices.

In accordance with some embodiments of the present invention, there is provided a process for producing a frequency conversion device, including the steps of:
forming, on a substrate, an array of mutually spaced semiconductor islands composed of at least one III-V semiconductor compound and configured so that a pump beam of radiation of a first wavelength and signal radiation of a second wavelength incident upon the semiconductor islands causes them to emit radiation of a third wavelength different to the first and second wavelengths by a sum frequency generation or a difference frequency generation process, wherein the substrate is substantially opaque to electromagnetic radiation of the third wavelength; and attaching the semiconductor islands to a support that is substantially transparent to radiation of the second wavelength to provide a frequency conversion device wherein the array of mutually spaced nanometre-scale semiconductor islands is supported by the transparent support so that radiation of the first and second wavelengths incident upon the frequency conversion device causes it to emit radiation of the third wavelength, and at least the radiation of the third wavelength passes through the transparent support.

In some embodiments, the process includes removing the substrate from the semiconductor islands.

In some embodiments, the semiconductor islands are at least partially embedded in the transparent support.

In some embodiments, the transparent support includes a transparent substrate attached to a layer of a transparent material in which the semiconductor islands are at least partially embedded.

In some embodiments, the transparent substrate is a glass or $MgF_2$ or $BaF_2$ substrate, and the transparent material is a polymer.

In some embodiments, the process includes configuring the semiconductor islands to support Mie resonances at the first and/or second and/or third wavelengths.

In accordance with some embodiments of the present invention, there is provided a frequency conversion process, including directing a pump beam of electromagnetic radiation of a first wavelength and signal radiation of a second wavelength onto an array of mutually spaced III-V compound semiconductor islands supported by a transparent support to cause the array to emit radiation of a third wavelength different to the first and second wavelengths by a sum frequency generation or a difference frequency generation process; wherein at least the radiation of the third wavelength passes through the transparent support.

In some embodiments, the radiation of the third wavelength is generated by a sum frequency generation process. In some embodiments, the pump beam of electromagnetic radiation of the first wavelength is in the infrared region of the electromagnetic spectrum. The radiation of the third wavelength may be in the visible region of the electromagnetic spectrum.

In some embodiments, the radiation of the third wavelength is generated by a difference frequency generation process. In some embodiments, the pump beam of electromagnetic radiation of the first wavelength is in the visible region of the electromagnetic spectrum. The radiation of the third wavelength may be in the visible region of the electromagnetic spectrum.

Also described herein is a frequency conversion device, including an array of mutually spaced semiconductor islands composed of at least one III-V semiconductor compound and configured so that electromagnetic radiation of a first wavelength incident upon the semiconductor islands causes them to emit electromagnetic radiation of a second wavelength different to the first and second wavelengths by a sum frequency generation or a difference frequency generation process, wherein the semiconductor islands are supported by a transparent support such that the support is substantially transparent to radiation of the second wavelength, wherein at least the radiation of the second wavelength passes through the transparent support.

In some embodiments, the radiation of the second wavelength is simultaneously emitted in a forward direction and a backward direction relative to the direction of incidence of the radiation of the first wavelength. The semiconductor islands may be configured to support Mie resonances at the first and/or second wavelengths.

Also described herein is a night vision device including of any one of the above frequency conversion devices.

Also described herein is a process for producing a frequency conversion device, including the steps of:

forming, on a substrate, an array of mutually spaced semiconductor islands composed of at least one III-V semiconductor compound and configured so that radiation of a first wavelength incident upon the semiconductor islands causes them to emit radiation of a second wavelength shorter than the first wavelength by a nonlinear frequency conversion process, wherein the substrate is substantially opaque to electromagnetic radiation of the second wavelength;

attaching the semiconductor islands to a support that is substantially transparent to radiation of the second wavelength to provide a frequency conversion device wherein the array of mutually spaced nanometre-scale semiconductor islands is supported by the transparent support so that radiation of the first wavelength incident upon the frequency conversion device causes it to emit radiation of the second wavelength, and at least the radiation of the second wavelength passes through the transparent support.

Also described herein is a frequency conversion process, including directing radiation of a first wavelength onto an array of mutually spaced III-V compound semiconductor islands supported by a transparent support to cause the array to emit radiation of a second wavelength shorter than the first wavelength by a nonlinear frequency conversion process; wherein at least the radiation of the second wavelength passes through the transparent support.

Also described herein is a frequency conversion device, including a source of a pump beam of electromagnetic radiation of a first wavelength, and an array of mutually spaced semiconductor islands composed of at least one III-V semiconductor compound and configured so that the pump beam of electromagnetic radiation of the first wavelength incident upon the semiconductor islands and electromagnetic radiation of a second wavelength incident upon the semiconductor islands cause the semiconductor islands to emit electromagnetic radiation of a third wavelength shorter than the second wavelength by a nonlinear frequency conversion process.

BRIEF DESCRIPTION OF THE DRAWINGS

Some embodiments of the present invention are hereinafter described, by way of example only, with reference to the accompanying drawings, wherein:

FIGS. 12 to 15 are schematic side-views illustrating the formation of a transparent embedding layer (which will later become the transparent substrate after removal of the original substrate) on the semiconductor islands using a hot embossing step;

FIG. 16 includes an SEM image of a test sample to illustrate the relationship between a polymer (BCB in this example) embedding layer, the semiconductor islands, and the original substrate (prior to its removal);

FIG. 21 is a schematic illustration of the linear spectral measurements of the semiconductor islands;

FIG. 22 shows extinction spectra of individual semiconductor islands as measured experimentally (left-hand panel) and calculated theoretically (right-hand panel), where the different island diameters (in nm) are given next to the spectra, and where the dashed vertical lines show the spectral positions of the incident and the second harmonic frequencies;

FIG. 23 is a graph of linear extinction and its multipolar decomposition as a function of the diameters of the semiconductor islands at the pump wavelength of 1556 nm, where the black solid line indicates the theoretical calculation, the dots indicate experimental measurements, and the coloured lines indicate the calculated multipolar contributions to the theoretical calculation as indicated in the legend;

FIG. 24 is a schematic illustration of the nonlinear spectroscopy of an individual semiconductor island;

FIG. 25 is a bar chart of experimentally measured second harmonic generation (SHG) efficiency ($P_{SH}/P_{FW}$) from single semiconductor islands of different diameters at the pump wavelength of 1556 nm, where blue indicates forward radiation, red indicates backward radiation, and green indicates the sum of forward and backward;

FIG. 26 is a bar chart of the backward-to-forward ratio of the second harmonic as a function of island diameter;

FIG. 51 is a schematic diagram illustrating an incident beam with s-polarisation or p-polarisation;

FIGS. 61(b) and (c) are graphs of the simulated and experimentally measured linear spectra of each of the different semiconductor islands;

FIG. 62 (b) is a plot representing the three-dimensional spatial distribution of visible light emission from a semiconductor island embedded in a low index material;

FIG. 62 (c) is the same as FIG. 62 (b), but where the semiconductor island is attached to a glass substrate instead of being embedded;

FIG. 63 (b) is a graph of the calculated SFG intensity as a function of the angle $\theta_2$, when $\theta_1=90$ deg; the acceptance angle is defined by the full-width at half maximum of the SFG intensity;

FIG. 65 is a graph showing the measured optical spectrum of the output of a frequency conversion device for night vision using an 840 nm pump beam and a 1550 nm input signal, both of these wavelengths having being removed from the output by optical filters;

FIG. 66 includes (upper part) a schematic side view of a frequency conversion device in which an array of semiconductor islands (not shown) was embedded in a 4 µm BCB layer on an $MgF_2$ substrate so that an 840 nm pump beam incident along the plane of the BCB layer was confined by waveguiding in the BCB layer containing the semiconductor islands, and (lower part) an image showing the pump beam confined within the BCB layer;

FIG. 67 is a graph of optical transmission through a frequency conversion device array and substrate as a function of wavelength, showing excellent transmission in excess of 80% at all wavelengths across the visible spectrum (400 to 700 nm);

FIG. 68 includes four images of a standard optical test object taken through an optical microscope and the same frequency conversion device as FIG. 67: (top left) under white light illumination; (top right) under both IR illumination and the pump beam; (lower left) under IR illumination without pump beam; (lower right) with pump beam but without IR illumination;

DETAILED DESCRIPTION

Figure 1:
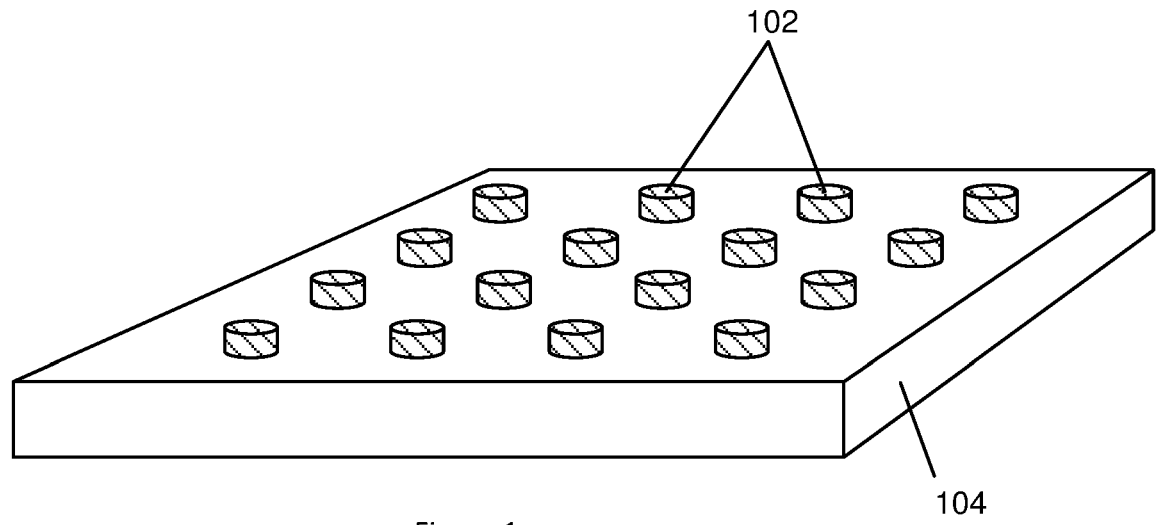
FIGS. 1 and 2 are perspective and side views, respectively, of a frequency conversion device in accordance with some embodiments of the present invention, including an array of III-V semiconductor islands on a transparent support and configured for nonlinear frequency conversion.
Figure 2:
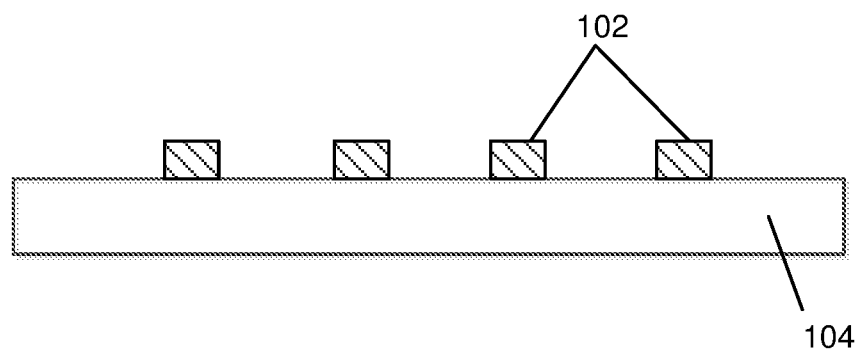
Figure 3:
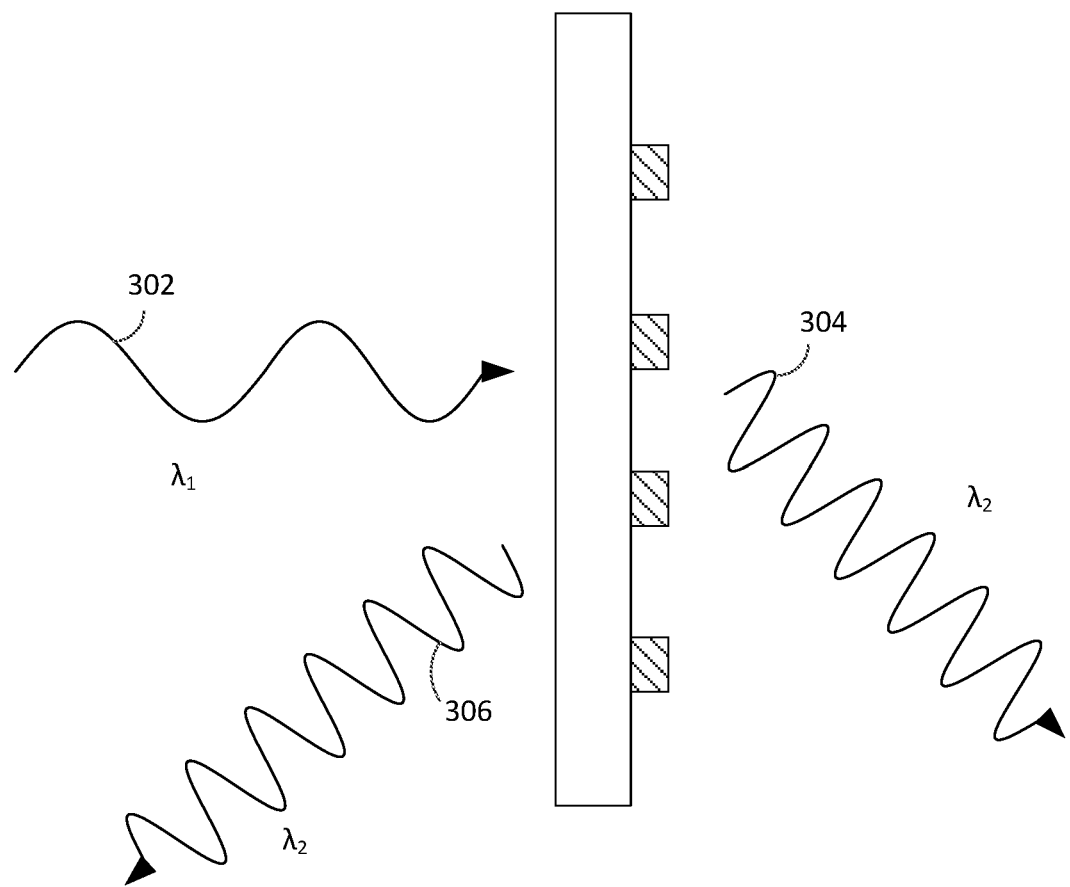
FIG. 3 illustrates one mode of operation of the frequency conversion device of FIGS. 1 and 2, wherein radiation of a first wavelength incident upon the islands causes them to emit output radiation of a second wavelength shorter than the first wavelength by a non-linear frequency conversion process.

As shown in FIGS. 1 and 2, a frequency conversion device includes an array of mutually spaced semiconductor bodies or islands 102 supported by a transparent support 104. Although the shape of the islands 102 in plan view is typically circular as shown, they can alternatively be formed with essentially any desired shape. The islands 102 are composed of at least one III-V compound semiconductor, and are configured so that, as shown in FIG. 3, electromagnetic radiation 302 of a first wavelength $\lambda_1$ incident upon the semiconductor islands 102 causes them to emit electromagnetic radiation 304, 306 of a second wavelength $\lambda_2$ that is shorter than the first wavelength $\lambda_1$ by way of a nonlinear frequency conversion process.

In order to improve the efficiency of frequency conversion, embodiments of the present invention add a pump beam of electromagnetic radiation, as will be described in detail below, to the general structure described above. However, properties of the semiconductor island arrays and transparent substrates are first described before introducing the pump beam.

Compound semiconductors formed from combinations of elements from groups III and V of the periodic table (referred to in the art as "III-V semiconductors") are used because they have relatively large quadratic non-linear electromagnetic properties. In contrast, elemental semiconductors such as Si and Ge do not exhibit bulk quadratic nonlinearity due to their centro-symmetric crystalline structure.

The property of the support 104 described as "transparent" in the context of this specification should be understood as meaning that the support is at least substantially transparent to radiation of the corresponding wavelength, as described further below. As will be understood by those skilled in the art, in practice no medium is completely transparent, and there will always be at least a small degree of loss when electromagnetic radiation passes through a medium, hence when the support is described herein as being transparent, it will be understood that this does not require the support to be completely transparent with zero insertion loss.

In the context of this specification, transparency should be understood as meaning that, at a minimum, at least 10% of radiation of the corresponding wavelength incident upon the support 104 is transmitted through the support 104 in order for it to be considered as being 'transparent' to that radiation. Preferably, that amount of radiation is at least 20%, more preferably at least 50%, even more preferably at least 70%, and most preferably at least 80%. As will be appreciated by those skilled in the art, a transmission of around 70% is generally considered to be a 'good' degree of transmission. In the described embodiments, a transmission of around 80% or more is typical.

In the general case, the transparency of the support allows at least one of the radiation of the first wavelength and the radiation of the second wavelength to pass through the transparent support. However, in some embodiments, the emitted electromagnetic radiation can include radiation emitted in a direction that is emitted at an angle of more than 90° relative to the direction of incidence of the radiation of the first wavelength, as shown by 306 in FIG. 3.

The values of the first and second wavelengths are determined by the configuration(s) of the compound semiconductor islands, specifically their composition(s) and their physical dimensions, allowing the semiconductor islands to be configured so that the values of the first and second wavelengths suit a particular application of interest. However, as indicated above the composition of the compound semiconductor is chosen to support a nonlinear frequency conversion process that effectively blue-shifts the incident radiation of the first wavelength to the output radiation of the second wavelength that is shorter than the first wavelength. It will be apparent to those skilled in the art that other nonlinear interactions can also be used to generate output radiation of a second wavelength that is shorter than the first wavelength.

The semiconductor islands can be formed of any III-V compound semiconductor provided that the lattice mismatch between the crystalline semiconductor and the corresponding transparent crystalline substrate is not so large that it causes high concentrations of defects in the semiconductor that effectively render the frequency conversion processes ineffective in a practical sense. Examples of suitable compounds include those based on GaN, GaSb, GaAs, InP, InAs and InGaAs. For example, the semiconductor islands may be composed of $Al_x Ga_{(1-x)} As$ or $In_x Ga_{(1-x)} As$ with $x \in [0, 1]$. The orientation of the substrate (and thus the orientation of the semiconductor islands epaxially grown on the substrate) is typically a major crystallographic orientation such as [100], [110], or [111].

Figure 4:
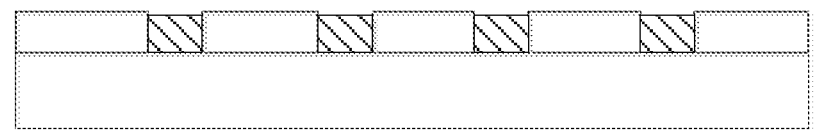
FIGS. 4 and 5 are schematic side-views of respective further embodiments in which the semiconductor islands are partially or completely embedded in a transparent support.
Figure 5:
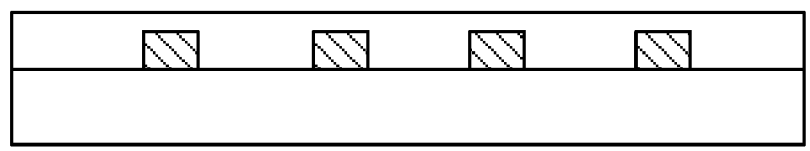
Figure 6:
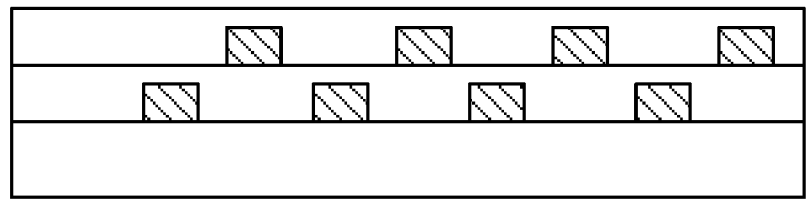
FIG. 6 is a schematic side view of yet a further embodiment in which multiple layers of semiconductor islands are embedded in a transparent support.

The semiconductor islands can be freestanding and proud of the transparent support, as shown in FIGS. 1 and 2, or partially embedded, as shown in FIG. 4, or completely embedded in the transparent support, as shown in FIG. 5. In some embodiments, the array of semiconductor islands is a three-dimensional array, as shown in FIG. 6. Although FIG. 6 shows such an array as a stack of two layers of two-dimensional arrays of semiconductor islands, in other embodiments this stacking can be continued to provide a stack with three or more layers. The different layers can include islands composed of different compound semiconductors. Additionally, the semiconductor islands in each of the stacked layers can be completely embedded, as shown in FIG. 6, or partially embedded. Additionally, the pitch and/or relative alignment of semiconductor islands in different layers can be arranged in a wide variety of different ways. The physical dimensions of islands in any given layer and/or in different layers can also differ.

The frequency conversion devices described herein are thus able to up-convert or blue-shift non-ionising electromagnetic radiation over a wide range of input wavelengths and output wavelengths, as determined by the configuration(s) of the individual compound semiconductor islands. Accordingly, by providing islands of different composition and/or physical dimensions in a single two-dimensional array or three-dimensional array, a single frequency conversion device as described herein can provide conversion over a wide range of desired input and/or output wavelengths.

In particular, where the described compound semiconductor islands are configured to blue-shift incident infrared radiation, a frequency conversion device as described herein can be used for thermal imaging or night vision. In some embodiments, the blue-shifting produces light at wavelengths in the visible wavelength region. In any case, by including compound semiconductor islands of different configurations selected to blue-shift different wavelengths of infrared radiation to respective different wavelengths of visible light, a colour representation of objects having different temperatures and/or emissivities can be generated, either directly (if the output wavelengths are in the visible region), or indirectly (in all cases) via standard amplification and image generation methods known to those skilled in the art (including those currently used in existing thermal imaging and night vision equipment).

Fabrication of Non-Linear Electromagnetic Devices

Figure 7:
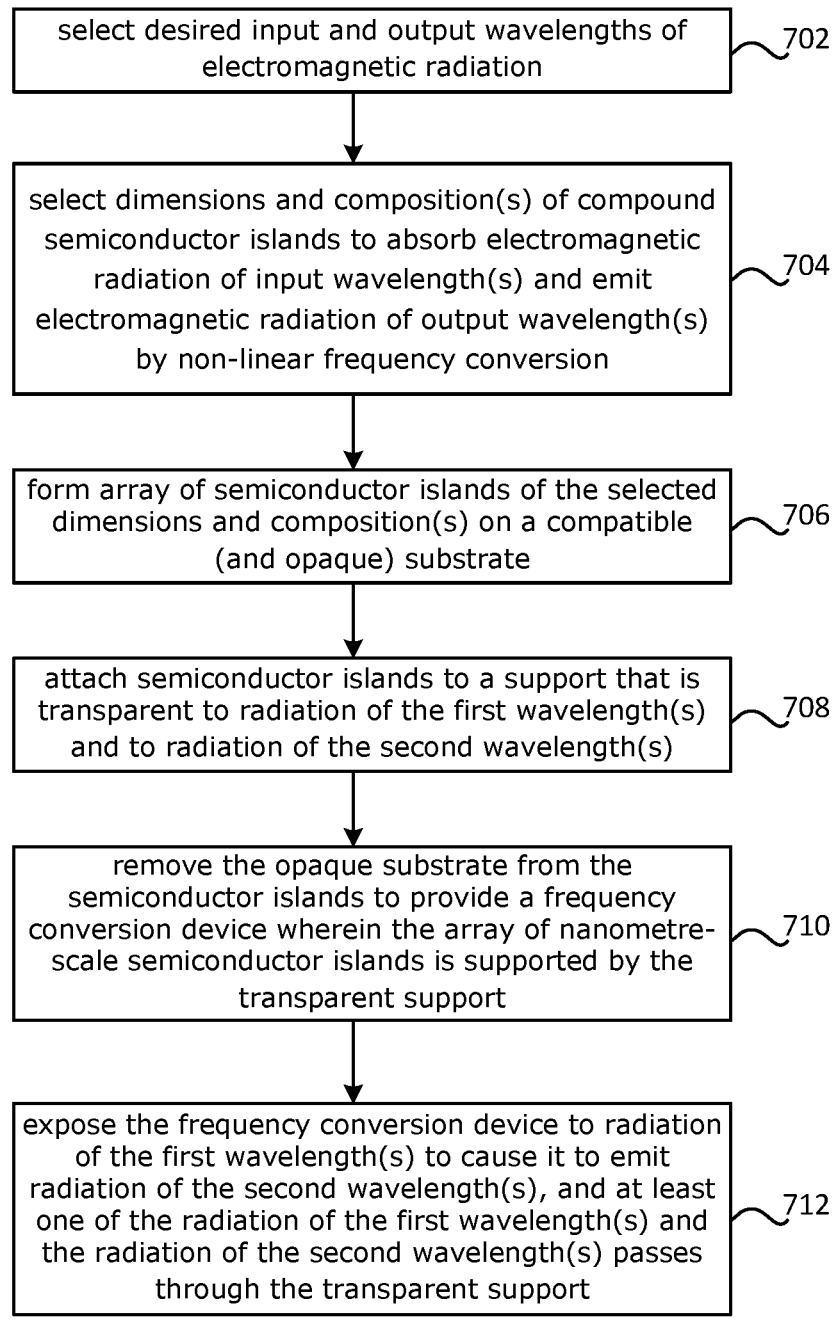
FIG. 7 is a flow diagram of an embodiment of a process for producing a frequency conversion device.

The frequency conversion devices described herein can be manufactured by a production process such as that shown in FIG. 7. The process begins at step 702 by selecting at least one desired input (or "first") wavelength and at least one desired output (or "second") wavelength. As described above, these wavelengths will generally be determined by the specific application for which the frequency conversion device is to be applied. In the described embodiments, the frequency conversion device is to be used for night vision or thermal imaging, and accordingly the first wavelengths are in the infrared region of the electromagnetic spectrum (and are about 10 μm or less), and the second wavelengths are in the visible region of the electromagnetic spectrum.

Having chosen the input and output wavelengths, at step 704, these are used to determine at least one corresponding configuration of the compound semiconductor islands, in particular the composition(s) and physical dimensions of the islands to support those wavelengths.

In the described embodiments, the semiconductor islands are in the form of cylinders composed of compound semiconductors with compositions of $Al_x Ga_{(1-x)}As$ or $In_xGa_{(1-x)}As$, with $x \in [0, 1.0]$ or alloys thereof, i.e., ranging from GaAs to AlAs, InAs or InGaAs. In the case of $In_xGa_{(1-x)}As$ compounds, it is found that islands composed of $In_{0.53}Ga_{0.47}As$ provide the best performance, as it provides the smallest lattice mismatch with the InP substrate, and consequently produces the lowest defect density.

In the described embodiments, the dimensions of the islands are nanometer-scale ('nanoscale') dimensions of about 20 nm-10 μm). Appropriate physical dimensions for a given desired wavelength and compound semiconductor composition can be determined by simulation, using a computational electromagnetics software package such as COMSOL Multiphysics®, for example, as described at https://www.comsol.com/comsol-multiphysics.

At step 706, an array of compound semiconductor islands of the selected dimensions and composition are formed on a crystalline substrate that is compatible with epitaxial growth of the selected compound semiconductor. For example, in the case of $Al_xGa_{(1-x)}As$ compounds, the substrate can be a single-crystal GaAs wafer, and in the case of $In_xGa_{(1-x)}As$ compounds, the substrate can be a single-crystal InP wafer. Unfortunately, compatible substrates have high refractive indices and are opaque to electromagnetic radiation in the wavelength ranges of interest (e.g., in the visible region). Growth of compound semiconductors on transparent substrates such as glass results in a high density of dislocations in the grown semiconductors, and therefore poor characteristics.

Typically, the formation step 706 involves standard semiconductor processing steps known to those skilled in the art, including epitaxial growth of a layer of the corresponding compound semiconductor on an opaque semiconductor substrate (possibly preceded by an intermediate or buffer layer, as described below), followed by deposition of a mask layer, patterning of the mask layer by lithography, selected area etching of the compound semiconductor layer, and removal of the remaining mask material. The specific details of the steps required to form compound semiconductor islands of a desired configuration are well within the capabilities of those of ordinary skill in the art.

In some embodiments, the semiconductor islands are at least partially decoupled from the substrate in order to weaken their attachment to the substrate. This can be achieved by growing an intermediate layer on the substrate, prior to growing the compound semiconductor from which the islands will be formed, with the intermediate layer being formed of a material that can be selectively removed in order to decouple the overlying semiconductor islands. Residual (but relatively weak) coupling forces (including Van der Waals forces) maintain the semiconductor islands at their originals locations. For example, where the semiconductor islands are composed of $Al_xGa_{(1-x)}As$ compounds with $x \in [0, \approx 0.8]$, AlAs can be used as the intermediate layer as it is preferentially etched by HCl.

In all cases, having formed the compound semiconductor islands on the opaque substrate, at step 708 they are bonded to a transparent support, and at step 710 the opaque substrate is removed to provide the frequency conversion device in the form of mutually spaced semiconductor islands supported by the transparent substrate. In embodiments where the semiconductor islands have been decoupled, the opaque substrate can be removed by simply pulling it away from the semiconductor islands, because the decoupling step causes the bonding between these to be weaker than the bonding between the semiconductor islands and the transparent support. Otherwise, in the absence of the decoupling step, the opaque substrate can be removed by etching, for example. In the case of $In_xGa_{(1-x)}As$ compounds on an InP substrate, for example, the substrate can be preferentially removed by HCl acid. In the case of AlAs compounds on a GaAs substrate, for example, the substrate can be preferentially removed by a citric acid/$H_2O_2$ solution.

As described above, the resulting frequency conversion device can be used at step 712 to blue-shift electromagnetic radiation.

Incidentally, although it would be possible to transfer the compound semiconductor layer to a transparent (e.g., glass) substrate and then pattern the bonded layer to form mutually spaced islands of the compound semiconductor, in practice due to poor adhesion and fragility of the transferred layer, it is not generally possible to form the islands in this way with high spatial resolution and smooth surfaces and edges, which are required characteristics to achieve high non-linear conversion performance.

Some embodiments of the present invention are now described in the context of frequency conversion devices configured to convert infrared radiation to visible radiation for thermal imaging or night vision applications. In these embodiments, the compound semiconductor composition was chosen to be $Al_{0.2}Ga_{0.8}As$ of [100] crystallographic orientation normal to the plane of a two-dimensional array of islands of this compound, and the semiconductor islands were chosen to be cylinders or disks having various diameters in the range of 340-690 nm and a fixed height of about 300 nm so that the semiconductor islands would support Mie-type resonances at the input and output wavelengths (since the frequency conversion frequency is maximised when the semiconductor islands are resonant at both the input and output wavelengths). In the described embodiment, the islands were arranged on a square grid at a pitch or periodicity of 5 μm. However, in general, the islands can be arranged in any manner, including hexagonal lattice arrangements for high packing density, quasi-random arrangements, and arrangements that provide diffraction of the output radiation (e.g., to excite Fano resonances and enhance efficiency). For comparison, some arrays of islands of the same composition were formed at a pitch of 1 μm.

A 20 nm AlAs sacrificial buffer layer was epitaxially grown on [100] GaAs wafers by metal-organic chemical vapour deposition (MOCVD), followed by a 300 nm layer of $Al_{0.2}Ga_{0.8}As$, and finally a 5 nm GaAs capping layer to prevent oxidation of the $Al_{0.2}Ga_{0.8}As$. A 400 nm $SiO_x$ masking layer was then deposited over the $Al_{0.2}Ga_{0.8}As$ by plasma-enhanced chemical vapour deposition (PECVD). The mask layer was then patterned using electron-beam lithography and reactive ion etching using $Cl_2$, Ar and $H_2$ gases to remove all of the masking layer except for a square array of circular regions having the pitch and diameters indicated above.

Figure 8:
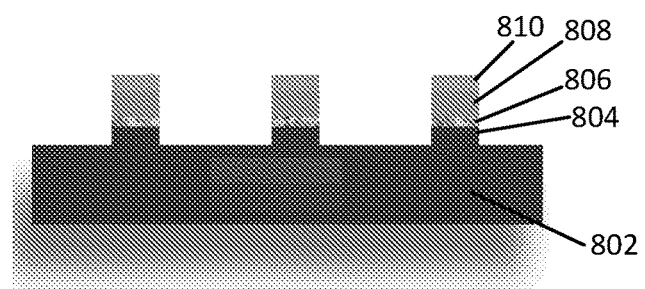
FIGS. 8 to 11 include schematic side-views of partially fabricated frequency conversion devices at different steps of the production process of FIG. 7, together with corresponding scanning electron microscope (SEM) images showing details of the semiconductor islands.
Figure 9:
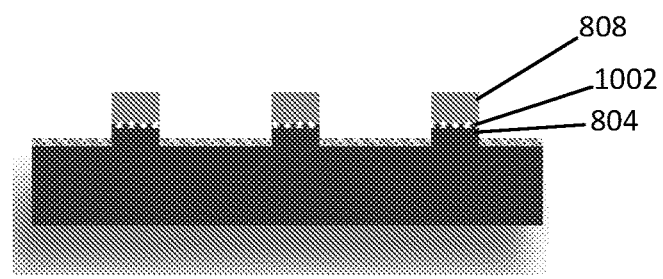

The compound semiconductor regions exposed by the circular openings in the mask layer were then etched in an inductively coupled plasma (ICP) etching tool to remove all of the epitaxially grown compound semiconductors and a small amount of the GaAs substrate. As shown in the schematic diagram of FIG. 8 and the scanning electron microscope (SEM) image of FIG. 9, the resulting structure consists of the remaining GaAs substrate 802 with cylindrical pillars formed of layers of GaAs 804, AlAs 806, $Al_{0.2}Ga_{0.8}As$ 808, and $SiO_2$ 810. In the described embodiment, the etching was performed in a plasma etching tool using $Cl_2$, Ar, and $H_2$ gases. Although other process gases and/or subtractive methods (e.g., ion-milling) can be used to achieve the same structure, the use of $Cl_2$ as a purging gas results in a non-adhesive surface and thus assists with the subsequent removal of the semiconductor islands from the substrate, as described below.

Figure 10:
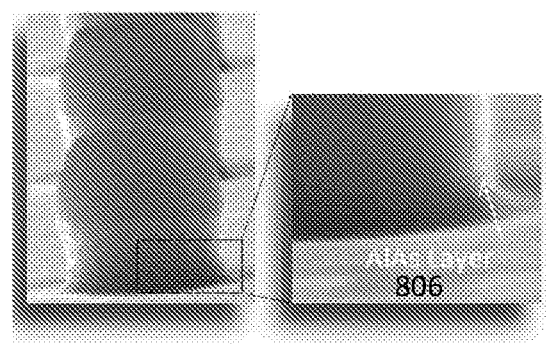
Figure 11:
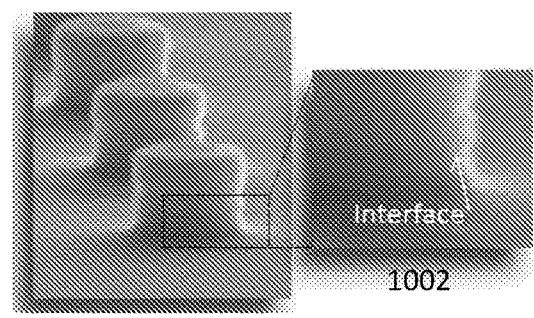

The $SiO_2$ layer 810 and the AlAs layer 806 are then removed from each pillar by wet etching in 2% HF to produce the structure shown in the schematic diagram of FIG. 10 and the SEM image of FIG. 11, wherein the removal of the AlAs layer 806 produces an interface (represented by the dotted line 1002 in FIG. 10) between the GaAs layer 804 and the $Al_{0.2}Ga_{0.8}As$ layer 808. As described above, if the AlAs layer 806 is completely removed (as shown in the SEM image of FIG. 11), van der Waals forces keep the $Al_{0.2}Ga_{0.8}As$ layer 808 in place; otherwise, if the AlAs layer 806 is not completely removed, then any remaining part of that layer 806 can act to maintain the $Al_{0.2}Ga_{0.8}As$ layer 808 in place.

After this step, the $Al_{0.2}Ga_{0.8}As$ layer/disks 808 are attached to a transparent support. In the described embodiments, the transparent support is a composite structure or assembly consisting of a transparent polymer on a planar transparent substrate/superstrate. In some embodiments, the transparent support is formed and attached by spin-coating a thin (4 μm in some embodiments) polymer layer on the sample, curing the polymer, and bonding it to a thin transparent substrate/superstrate, as shown in FIG. 12. The thickness of the polymer layer can then be reduced, typically but not necessarily to the height of the semiconductor islands by a hot embossing step, wherein the polymer layer is heated and made to flow around the semiconductor islands by applying pressure to the superstrate as shown in FIG. 14 to produce the structure shown in FIG. 15. For the purposes of illustration, the SEM image of FIG. 16 shows an array of $Al_{0.2}Ga_{0.8}As$ islands, some of which are embedded in a BCB polymer layer of the same (400 nm) height/thickness. As an alternative, in some embodiments the attachment is achieved by first bonding the polymer and superstrate layers, and then attaching the resulting composite support to the semiconductor islands, as shown in FIG. 13, before performing the hot embossing step described above and shown in FIG. 14.

In either case, the hot embossing step can also be used to simultaneously cure the polymer. For example, where the polymer is BCB, it needs to be cured at a temperature of about 300° C., and consequently the hot embossing step can be performed at that temperature or higher in order to simultaneously cure the BCB layer. Once cured, BCB acts like a glass and can be heated to substantially higher temperatures (e.g., up to at least 500° C.) without melting, which can facilitate the addition of one or more further layers (including BCB layers).

In various embodiments, the transparent substrate and the polymer layer can have the same, similar, or different refractive indices, depending on the application. In some embodiments, the substrate is a glass substrate, and the polymer is benzocyclobutene (BCB), with equivalent refractive index (~1.5) to glass, allowing the BCB and glass to act as a composite waveguide. In some embodiments, the substrate is a $MgF_2$ substrate (with a refractive index of about 1.3), as described below. In other embodiments, the substrate is a $BaF_2$ substrate or a quartz substrate. In some embodiments, the polymer is PolyDiMethylSiloxane (PDMS). Many other suitable transparent substrates and polymers and combinations thereof will be apparent to those skilled in the art in light of this disclosure.

Figure 17:
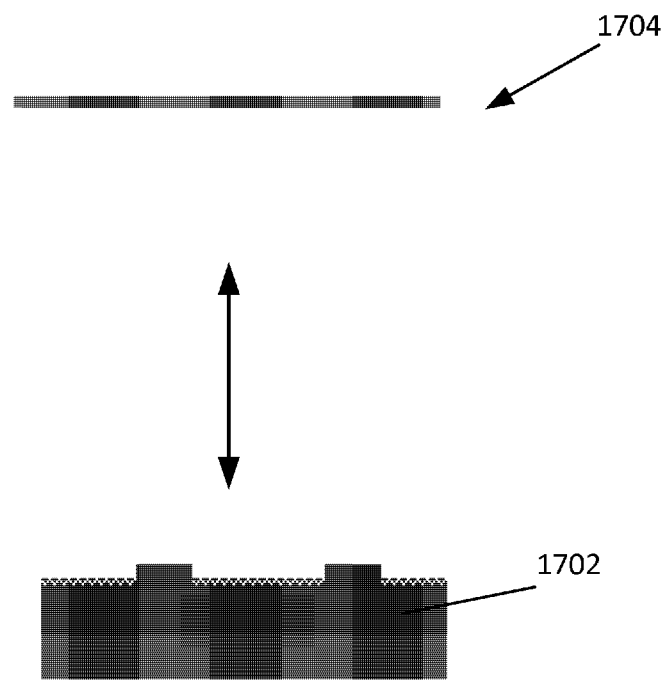
FIG. 17 illustrates a step of the production process of FIG. 7 in which the original opaque substrate is removed from the transparent substrate and partially embedded semiconductor islands.
Figure 18:
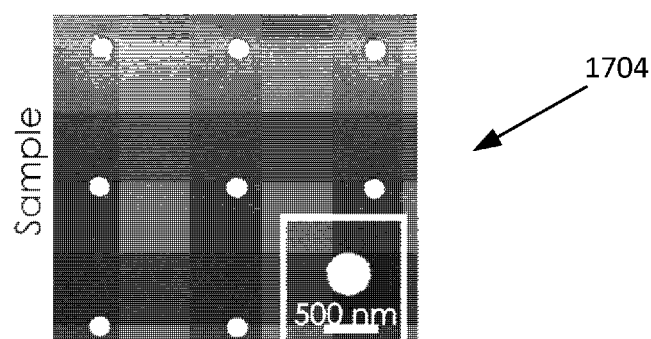
FIGS. 18 and 19 are plan view SEM images of the resulting frequency conversion device and original opaque substrate, respectively.
Figure 19:
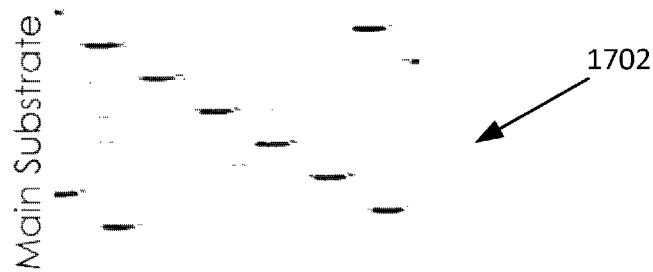

Finally, the remaining portion of the original opaque substrate 1702 is removed by peeling or otherwise pulling it away from the transparent superstrate, as shown in FIG. 17, to provide the frequency conversion device 1704. The $Cl_2$ gas treatment of the opaque substrate surface described above is optional, but the inventors have found that it facilitates this separation by reducing the adhesion of the transparent support to the opaque substrate. FIGS. 18 and 19 are SEM images of the resulting frequency conversion device 1704 and the opaque substrate 1702 (which can be discarded).

The resulting frequency conversion device 1704 is in the form of a two-dimensional array of compound semiconductor islands (in the form of cylinders or 'disks' in this example) partially embedded in a transparent superstrate. Optionally, the semiconductor islands can be completely embedded within the transparent substrate in a variety of different ways, but most simply by adding (e.g., by bonding or forming in situ (e.g., by spin coating and curing)) a second transparent substrate/superstrate to cover the exposed surfaces of the semiconductor islands. Optionally, a second hot embossing step can be performed to remove any gap between the second transparent substrate and the semiconductor islands. A three-dimensional, array of semiconductor islands can be formed by bonding two or more single-layer frequency conversion devices together. The bonding can be achieved by simply arranging a stack of single-layer devices, typically in a wafer alignment tool to determine the relative locations of the islands in different layers, and using the tool to apply heat and pressure to the stack in order to achieve bonding. In some embodiments, different etch mask layouts are used to form the different layers and thus can provide lateral offsets between the islands in different layers, if desired.

Optical Characterisation of Non-Linear Electromagnetic Properties

Figure 20:
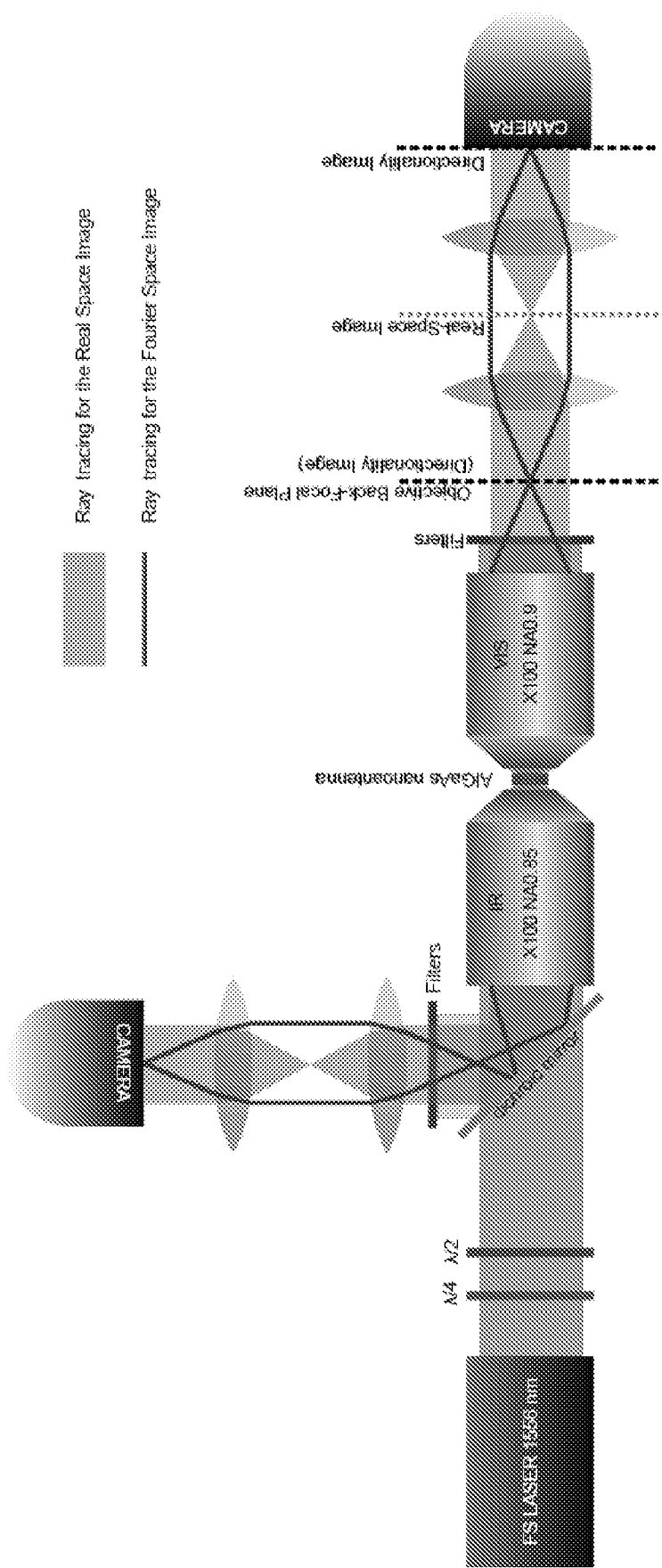
FIG. 20 is a schematic illustration of an experimental arrangement for characterising the optical properties of the semiconductor islands of the frequency conversion devices.

The electromagnetic behaviours of the manufactured frequency conversion devices and of single islands were characterised using a variety of different optical methods commonly used by researchers in the field. FIG. 20 is a schematic diagram showing an experimental configuration that was used to characterise two-dimensional arrays and individual islands of $Al_{0.2}Ga_{0.8}As$. To measure the non-linear generated output radiation, including second harmonic generation ("SHG"), from individual semiconductor islands, a single island is placed in the focal spot of two confocal air objective lenses: an Olympus LCPlanNIR (0.85 NA, 100×, infrared) for focusing of the FW, and an Olympus MPlanFLN (0.9 NA, 100×, visible) for collection of the output radiation. This corresponds to collection angles for the emission patterns within approximately 58° and 64° in air, which corresponds to collection angles of approximately 44° and 40° in glass and BCB.

The diameter of the focused pump laser beam is measured by performing knife-edge experiments and ensuring that the pump beam is close to a diffraction limit of 2.2 µm. The substrate side faces the visible objective. Thus, the objective lens of the Olympus MPlanFLN collects the output radiation from an individual island in the forward direction, and the Olympus LCPlanNIR lens collects the output radiation in the backward direction. The pump laser is a pulsed $Er^{3+}$-doped fiber laser (~500 fs, repetition rate of 5 MHz) operating at a wavelength of 1556 nm. At the laser output, a quarter-wave plate and a half-wave plate were used to control the output polarization, and two cooled CCD cameras were used to detect the output radiation. In the forward direction, a notch filter blocks the pump laser. In the backward direction, a dichroic mirror is used in front of the objective lens to direct the backward-directed output radiation onto the camera.

Linear Characterisation

The extinction spectra of individual AlGaAs nanodisks were measured using the same equipment in a confocal configuration, using a white-light source (fiber-coupled tungsten halogen light bulb) and two spectrometers: a Princeton Instruments Acton SP 2300 monochromator with Andor DU490A-1.7 InGaAs array detector for infrared wavelengths, and an Ocean Optics 65000 for wavelengths in the visible region. Transmission spectra were measured through a disk and a field diaphragm, and the extinction cross-sections were calculated using an approximate relation of $\ln(1-T)$, where T is the measured transmission, normalized to the transmission of the substrate.

The linear extinction spectra of individual islands was measured in a linear transmission arrangement, as shown schematically in FIG. 21. FIG. 22 includes two graphs: the left-hand graph shows the measured extinction cross-sections as a function of wavelength for semiconductor cylinders of different diameters ranging from 340 to 670 nm and a fixed height of 300 nm, and the right-hand graph shows the corresponding theoretical predictions of the rigorous coupled wave analysis (RCWA) numerical simulation method described in Hugonin, J. P.; Lalanne, and P. Reticolo, *Software for Grating Analysis*; Institut d'Optique: Orsay, France, 2005. The two vertical dashed lines in both graphs indicate the fundamental wave ("FW") wavelength and the second harmonic ("SH") wavelength, respectively. The shaded region in the left-hand graph indicates the wavelength range not covered by the spectrometers.

The measurements shown in FIG. 22 demonstrate a pronounced size-dependent resonance at the FW wavelength and multiple resonances at the SH wavelength, and are in good agreement with the numerical simulations shown in the right-hand graph. The discrepancies between the experiments and the theoretical predictions are believed to be due to fabrication imperfections and the finite numerical aperture of the measurement apparatus described above.

FIG. 23 shows the extracted scattering cross-sections at the FW as a function of the diameter of the semiconductor islands, where the dots represent experimental results, and the solid curves represent the numerical simulations. Multipolar decomposition was performed using the polarization currents induced inside each semiconductor island, and reveal that the resonant profile of the linear scattering, which is maximal for disk diameters of 400-500 nm, is essentially determined by a magnetic dipole excitation ("MD") and an electric dipole excitation ("ED") in each island, playing a dominant role at the pump FW wavelength (1556 nm). Some minor contributions of quadrupoles tend to grow slightly when the disk diameter is increased.

Figure 33:
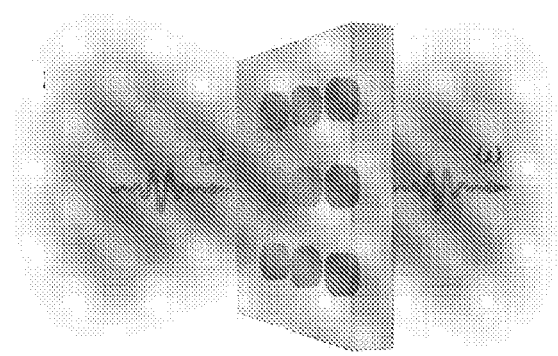
FIG. 33 is a schematic illustration of the transmission measurements of an array of semiconductor islands.
Figure 34:
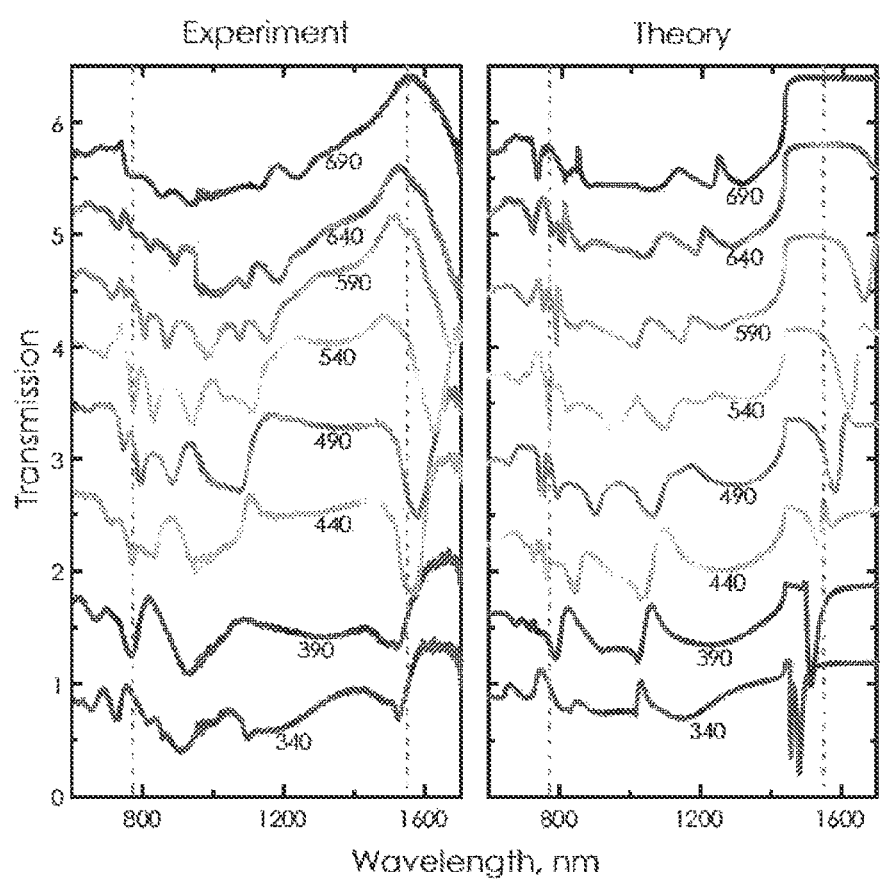
FIG. 34 includes transmission spectra of semiconductor island arrays as measured experimentally and calculated theoretically, respectively, where different island diameters (in nm) are given next to the spectra.

The linear measurements applied to single semiconductor islands as shown in FIGS. 21 and 22 were also applied to 100 µm×100 µm arrays of the islands, as represented schematically in FIG. 33, to produce the measured and simulated zero-order forward scattering spectra shown in FIG. 34 for a variety of island diameters. As with the single island measurements, the experimentally measured spectra are in good agreement with numerical calculations.

Second Harmonic Generation

It is noted that the highest extinction is achieved when the amplitudes of the electric dipole and magnetic dipole become equal. In other words, the highest extinction is observed for islands that satisfy the generalized Kerker condition. At the SH wavelength (778 nm), higher-order multipoles are excited in the islands. These two resonant conditions at the FW and the SH wavelengths are responsible for SHG enhancement in the islands. However, a more-sophisticated dependence of the SHG efficiency on the sizes of the semiconductor islands is expected when the spatial overlaps of the resonant modes at the FW and the SH fields are taken into account. These results suggest that there are optimal sizes of individual islands to maximise the efficiency of SHG from single islands.

The nonlinear response of individual islands supported by transparent supports was measured in both forward and backward directions (relative to the incident radiation) for various island diameters, using linear (vertical) polarization of the pump laser at a 45° angle of incidence relative to the crystalline axes of the islands, as shown in FIG. 23, in order to maximize the non-linear tensor component.

A laser beam with an average beam power of ~1 mW is focused by an infrared wavelength objective (NA=0.85) to a diffraction limited spot of 2.2 µm, resulting in a peak intensity of ~7 $GW/cm^2$. Another visible wavelength objective (NA=0.9) collects the SH emitted by the semiconductor island in a forward direction, while the focusing objective collects the SH radiation in a backward direction. The SH signal is detected by the two cooled CCD cameras, calibrated with a power meter.

The results of the SHG measurements from single $Al_{0.2}Ga_{0.8}As$ islands of different diameters are shown in FIG. 24 as values of SHG efficiency derived from the sum of the measured forward and backward SH signals. The overall dependence of the efficiency on the island size is complex due to the large number of higher-order modes that exist in the SH frequency band. The most efficient SHG is observed for the island with a diameter of 490 nm, having a conversion efficiency as high as $8.5 \times 10^{-5}$.

Importantly, as shown in FIG. 25, the directionality of the second harmonic emission can be determined by selecting the dimensions of the semiconductor island. For example, for cylindrical island diameters (also referred to herein as 'disks') of about 400 nm, the SH radiation is mostly backward, while for diameters of 500-600 nm, the backward-to-forward ratio remains close to unity, with a slight domination of the backward SH emission. At larger disk diameters, the backward-to-forward ratio peaks again; however, for these larger disks, the dependence becomes very sensitive to the island diameter due to the many higher-order multipoles that contribute to the SH scattering. The SH efficiency (FIG. 24) and backward-to-forward ratio (FIG. 25) are both generally sensitive to the geometry of the semiconductor islands. In particular, geometrical parameters can be tuned to bring high efficiency in overlap with comparable backward-to-forward ratio (as shown). Additionally, it is possible to simultaneously achieve high efficiency and unidirectionality.

An important feature of the measurements is that the SH radiation pattern can be characterised in both forward and backward directions as well as in transverse momentum space. The data, however, suggest that the experimental measurement apparatus is capturing only a small portion of the total SH radiated power due to the finite numerical apertures of the objectives.

To estimate the total efficiency of the radiated SH power, the nonlinear response of the semiconductor islands was simulated numerically using the finite element method solver in COMSOL Multiphysics in the frequency domain. In these simulations, each semiconductor island is assumed to be embedded in a homogeneous medium having a refractive index equal to that of the glass substrate. The material dispersion of the compound semiconductor is taken from COMSOL tabulated data. The second-order nonlinear susceptibility tensor of the [100] oriented $Al_{0.2}Ga_{0.8}As$, possessing a zinc blende crystalline structure, contains only off-diagonal elements $X_{ijk}^{(2)}$ with $i \neq j \neq k$. Thus, in the principal-axis system of the crystal, the ith component of the nonlinear polarization at the SH frequency is given by:

$$P_i^{(2\omega)} = \varepsilon_0 X_{ijk}^{(2)} E_j^{(\omega)} E_k^{(\omega)} \tag{1}$$

An undepleted pump approximation is assumed and two coupled steps are used to calculate the radiated SH power. First, linear scattering at the fundamental wavelength is simulated. To emulate the experimental conditions more accurately, the semiconductor island is excited by a focused monochromatic Gaussian beam, polarized along the [110] direction. The bulk nonlinear polarization given by Eq. 1, induced inside the island, is then employed as a source for the next electromagnetic simulation at twice the frequency, to obtain the generated SH field.

Figures 27, 28, 29, 30:
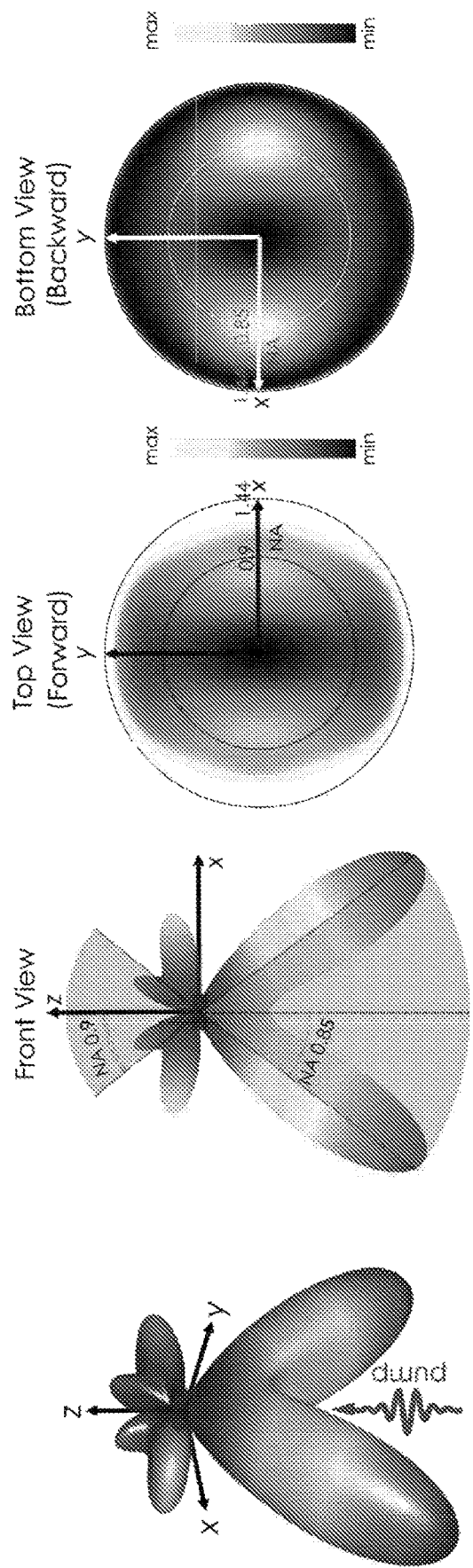
FIGS. 27 to 30 respectively show a calculated 3D pattern of far-field SH radiation, and front top and bottom views of the pattern, where the cones and inner circles indicate the experimentally accessible range of angles.

The disk size providing the maximum SH (d=490 nm) was chosen, and the three-dimensional SH far-field radiation pattern was calculated, as shown in FIG. 26. The non-linear scattering is governed by the interference of an electric quadrupole and higher-order nonlinearly generated multipoles (up to l=4), leading to the suppression of the forward SH radiation, as shown in FIG. 26. The side, top, and bottom views of this same radiation pattern are shown in FIGS. 27 to 29, respectively. The shaded area in FIG. 27 depicts the forward and backward collection angles of the SH signal in the experimental configurations described above. These collection angles are also indicated by the inner circles in the forward and backward far-field radiation images in FIGS. 28 and 29. Clearly, the energy collected in the experiment is less than the total generated SH. By integrating the amount of SH emitted within the numerical aperture of the objective lenses, it is estimated that only about 30% of the total SH energy is experimentally collected in the forward and backward directions. As such, the total generation efficiency is estimated to be three times larger than the measured collection efficiency, thus exceeding the prior art record value of $10^{-4}$. This high efficiency provides a solid ground for the use of the nonlinear semiconductor arrays described herein as functional elements for beam and polarization shaping.

The radiation patterns are measured by building back-focal plane (BFP) images of the SH radiation pattern by adding a pair of confocal lenses between the objective lenses and the cameras, in both forward and backward directions. The top left images in FIGS. 30 and 31 respectively show the radiation diagram captured by the objective lenses on the basis of their numerical aperture in forward (FIG. 31) and backwards (FIG. 32) directions. From these BFP images, it can be concluded that the SH radiation in the normal directions (the (0,0) point of the BFP images) is zero, as recently predicted theoretically. Zero SH emission in normal directions here originates from the symmetry of the nonlinear bulk $X^{(2)}$ tensor, and is therefore insensitive to geometry. As a result, zero SH emission is observed for all of the semiconductor islands that were fabricated as described above.

Third Harmonic Generation

Figure 35:
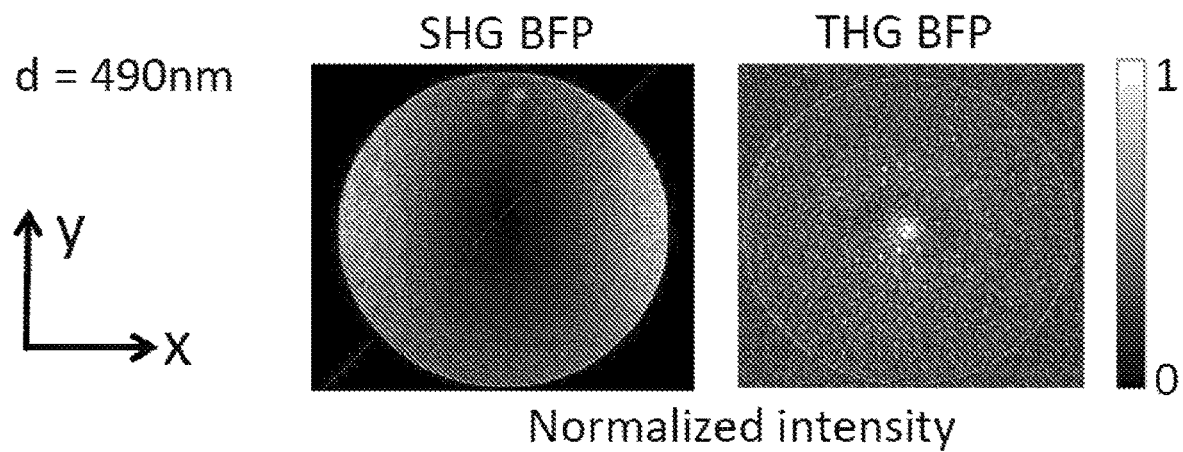
FIG. 35 includes experimentally measured backward back focal plane images of second and third harmonic generation from an AlGaAs semiconductor island with a 490 nm diameter.

To further support these findings, third harmonic generation ("THG") from the same islands was measured. The third harmonic relies on the $X^{(3)}$ nonlinear tensor, and in contrast to the SH radiation pattern has a radiation maximum in normal directions. Although the third-order nonlinear term of $Al_xGa_{(1-x)}As$ non-linear polarization is much weaker than the second-order non-linear term, it is nevertheless non-zero, and third harmonic generation (THG) signals from $Al_xGa_{(1-x)}As$ islands can be observed. The THG is expected to be similar to the THG from other well-studied materials like silicon and germanium. Therefore, in terms of the radiation pattern, the THG signals is non-zero in the direction normal to the disks axis. This characteristic is in contrast to the SHG radiation pattern, which is reflected in the doughnut shape of back-focal plane (BFP) images because of zero diagonal components of the second-order tensors. This difference is clear from the forward and backward normalised intensity images shown in FIG. 35, demonstrating that the measured doughnut shapes of SHG are indeed characteristic of the SH emission.

This is an important finding for arrays of the semiconductor islands, because the interference of emission from multiple islands of an array will result in lower radiation efficiency from the zeroth order SH beam. It is also noted that surface second-order nonlinearities can in principle result in normal SH radiation for specific excitation; however, surface SHG is not pronounced in these experiments, and the bulk $X^{(2)}$ is the dominant nonlinear contribution.

Polarisation Properties of the Second Harmonic

Figure 36:
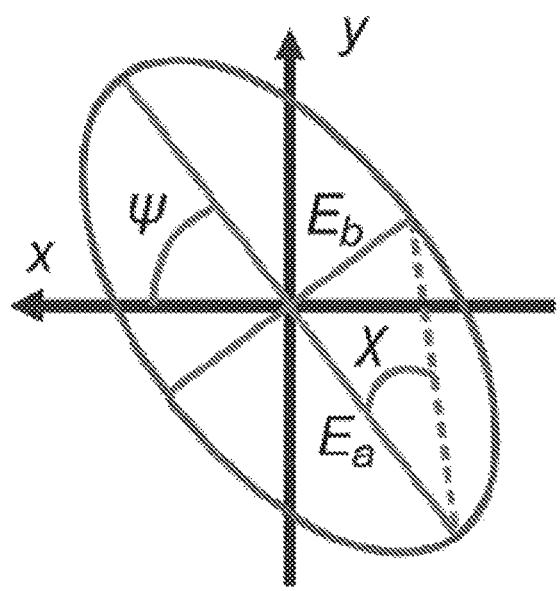
FIG. 36 is a schematic illustration of the polarization ellipse with the Stokes coefficients of ellipticity X angle and polarization-inclination angle ψ, where $E_a$ and $E_b$ are the main polarization axes (solid blue lines) of the polarization ellipse.

Even more intriguing is the polarization state of the observed far-field doughnut beam. To test the polarization properties of the SH radiation from the semiconductor islands, the spatially resolved polarization states of the BFP images were retrieved using the Stokes formalism. The Stokes coefficients provide a complete description of the light polarization state in terms of its total intensity $I_{tot}$, (fractional) degree of polarization $\rho$, polarization inclination angle $\psi$, and the ellipticity angle X. The ellipticity $\tan(X)$ is defined as the ratio of the two axes of the polarization ellipse (see FIG. 36), and the polarization inclination is described by the angle between the main polarization axis and the x-axis of the laboratory coordinate system.

Figure 37:
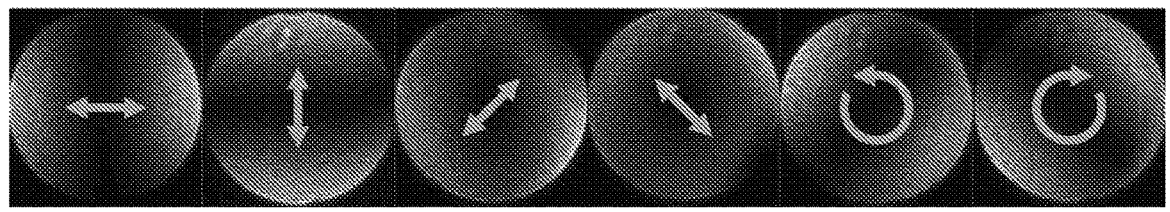
FIG. 37 includes back-focal plane images of second harmonic signals in a backward direction after transmission through six different polarizers: linear horizontal, vertical, two diagonal and two circular.

Experimentally, the Stokes parameters are found by measuring light transmission through a set of six different polarizers: linear horizontal, vertical, two diagonal and two circular polarizers realized by different orientations of the quarter-wave plate and a linear polarizer. The set of measurements for the backward directionality of SH emission from a disk with diameter of 490 nm are shown in FIG. 37.

The next step is to retrieve the Stokes vector $$M = \begin{bmatrix} I \\ Q \\ U \\ V \end{bmatrix},$$

where $$I=H+V=D_a+D_b=L+R$$

$$Q=H-V$$

$$U=D_a-D_b$$

$$V=L-R$$

Here, H is the transmission through horizontal polarizer, while V, $D_a$, $D_b$, L, R are the transmissions through vertical, two diagonal, left- and right-circular polarizers, respectively.

Figure 38:
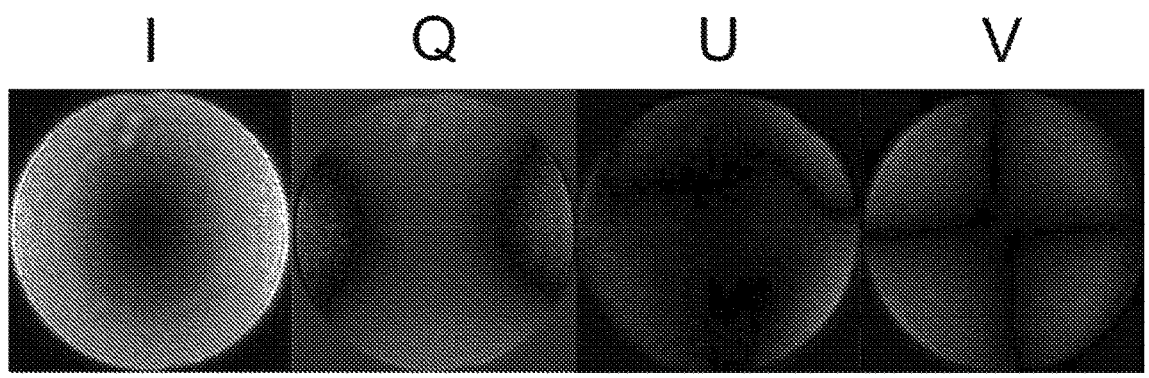
FIG. 38 shows four components of the Stokes vector for backward directionality of the second harmonic signal.

A set of four back-focal plane images forming the Stokes vector are shown in FIG. 38.

Next, the coefficients are calculated as follows:

$$\rho = \frac{\sqrt{Q^2+U^2+V^2}}{I}$$

$$\psi = \frac{1}{2}\arg(Q+iU)$$

$$\chi = \frac{1}{2}\arctan\left(\frac{V}{\sqrt{U^2+Q^2}}\right)$$

Figure 39:
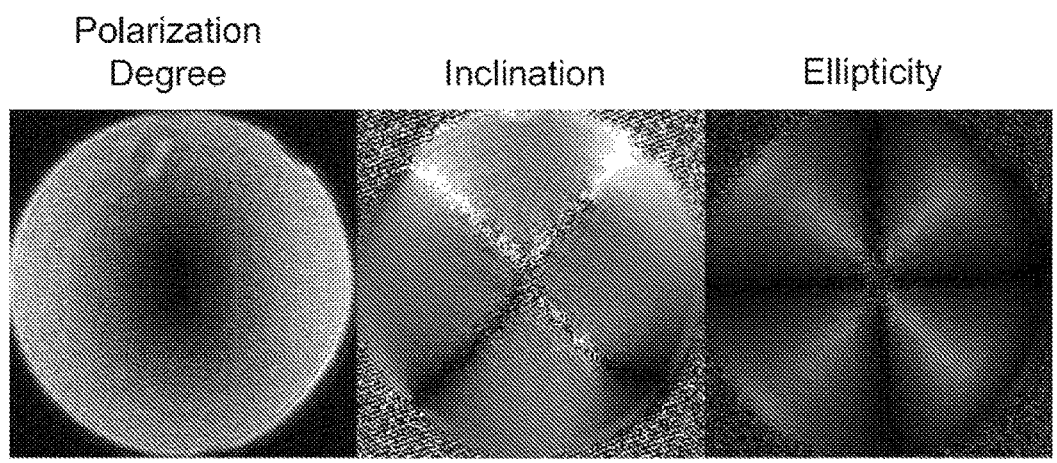
FIG. 39 shows the retrieved spatially-resolved degree of polarization, inclination and ellipticity.

The resulting coefficients are shown in FIG. 39.

Figure 31:
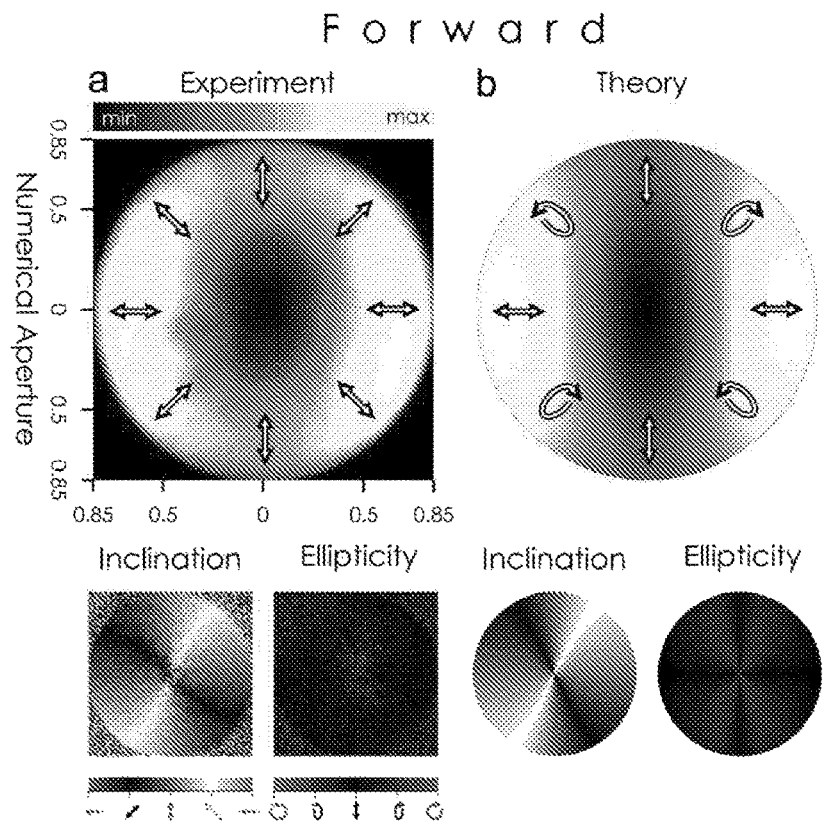
FIG. 31 includes directionality (top row) and polarization (bottom row) diagrams of the SH signal in a forward direction, as measured experimentally and as calculated theoretically, where the arrows visualize the polarization states, and the incident beam is linearly polarized along the vertical direction.
Figure 32:
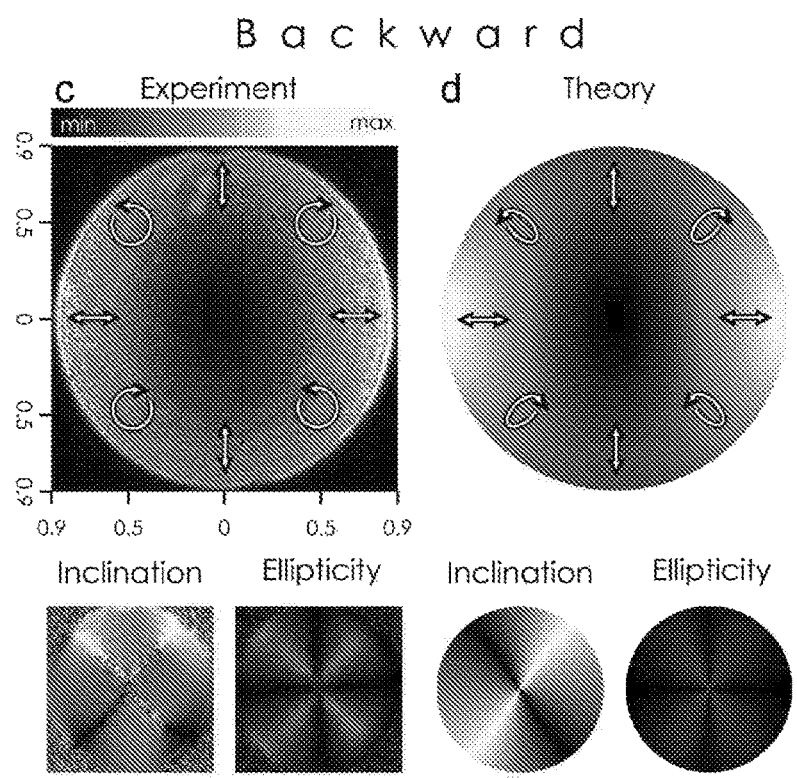
FIG. 32 is the same as FIG. 31, but for a backward direction.

We observe vector-beam formation at the SH frequency, as shown with arrows in FIGS. 31 and 32. In particular, nearly perfect radial polarization of the SH can be observed in the forward direction. In the backward direction, the polarization state is more complex, with polarization inclination having radial structure and ellipticity ranging from nearly circular to linear, as shown in FIG. 32. The polarization of the SH beam was calculated numerically, and is shown in the top right-hand images in FIGS. 31 and 32. Some differences between theory and experiment can be observed. These differences can be attributed to the slight non-uniformity of the device, in particular because the BCB does not fully cover the semiconductor islands.

The nonlinear generation of vector beams from the semiconductor islands can be intuitively understood by the excitation of Mie-type multipoles at the wavelengths of the input and output radiation. In the simplest exemplary case, a vector beam of radial polarization can be emitted by an electric dipole oriented along the optical axis of the disk antenna. In a more complex situation, as in the examples described herein, higher-order multipoles are excited at the SH wavelength. The superposition of these multipolar contributions governs the output polarization state. This can be engineered for a specific application.

The radiation patterns and polarization states of SH emission from the compound semiconductor islands described above demonstrate that nonlinear conversion efficiencies exceeding $10^{-4}$ can be achieved, so the described nanostructures can be applied used to provide functional nonlinear devices at the nanoscale. In particular, nonlinear nanoscale light sources emitting vector beams with a desired polarization state, e.g., radial polarization, have been experimentally demonstrated. These results open new avenues for novel nonlinear imaging, as well as applications such as bright fluorescent markers for bio-imaging, or constituent elements for efficient nonlinear holograms (which can be used as security devices, for example).

Figure 40:
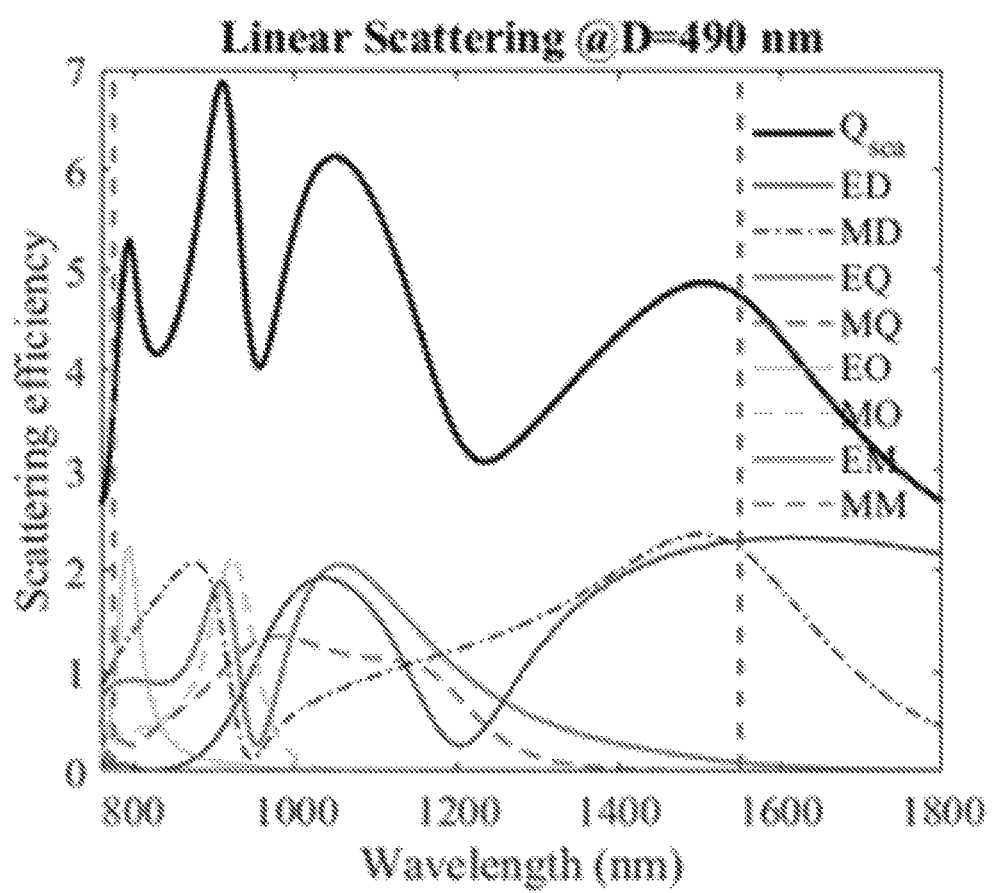
FIG. 40 is a graph of calculated scattering efficiency and multipole decomposition (up to fourth order) for AlGaAs semiconductor island with a diameter of 490 nm, and where the pump is set to be a plane wave polarized along the x axis.

Multipolar decomposition of these spectra support the attribution of the observed spectral resonances in the linear regime to excitation of Mie-type multipoles. Polarization currents were used for this task, and the island parameter that provided the best performance was 490 nm, with corresponding results shown in FIG. 40.

Figure 41:
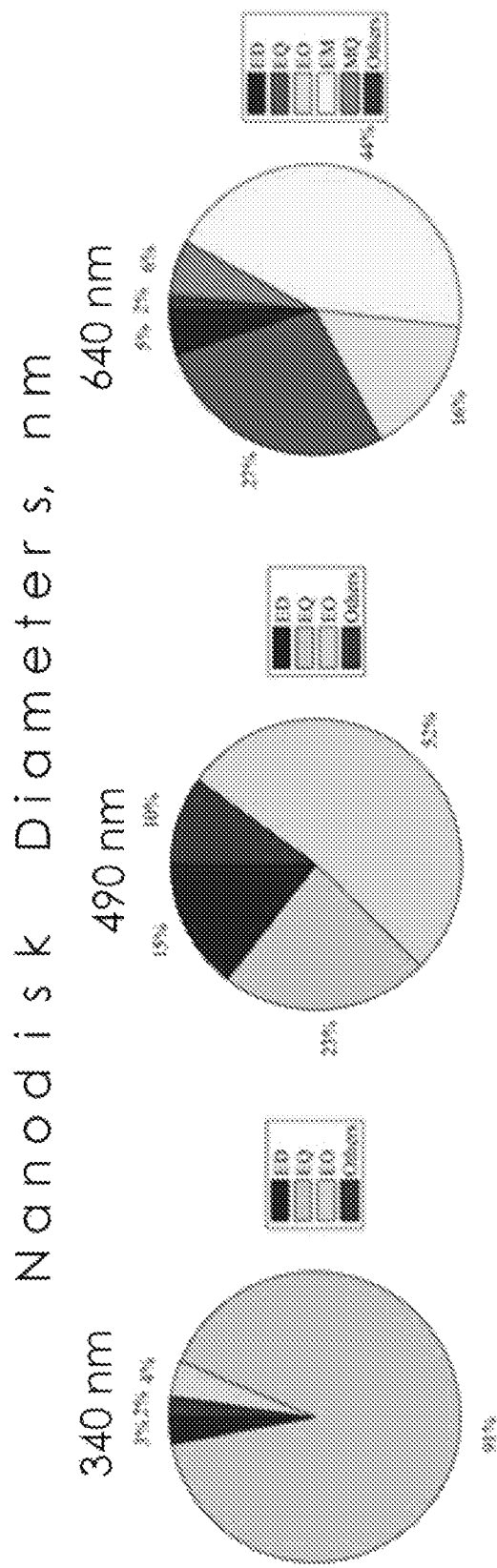
FIG. 41 includes three pie charts of the SH multipolar contributions calculated for three different island diameters: 340 nm (left), 490 nm (centre), and 640 nm (right)

Multipolar decomposition in the non-linear regime of SH fields was also performed, for cylindrical islands with diameters of 340 nm, 490 nm and 640 nm. The relative contributions of different multipoles into the SH for these three diameters are shown in the respective pie charts of FIG. 41.

Figure 42:
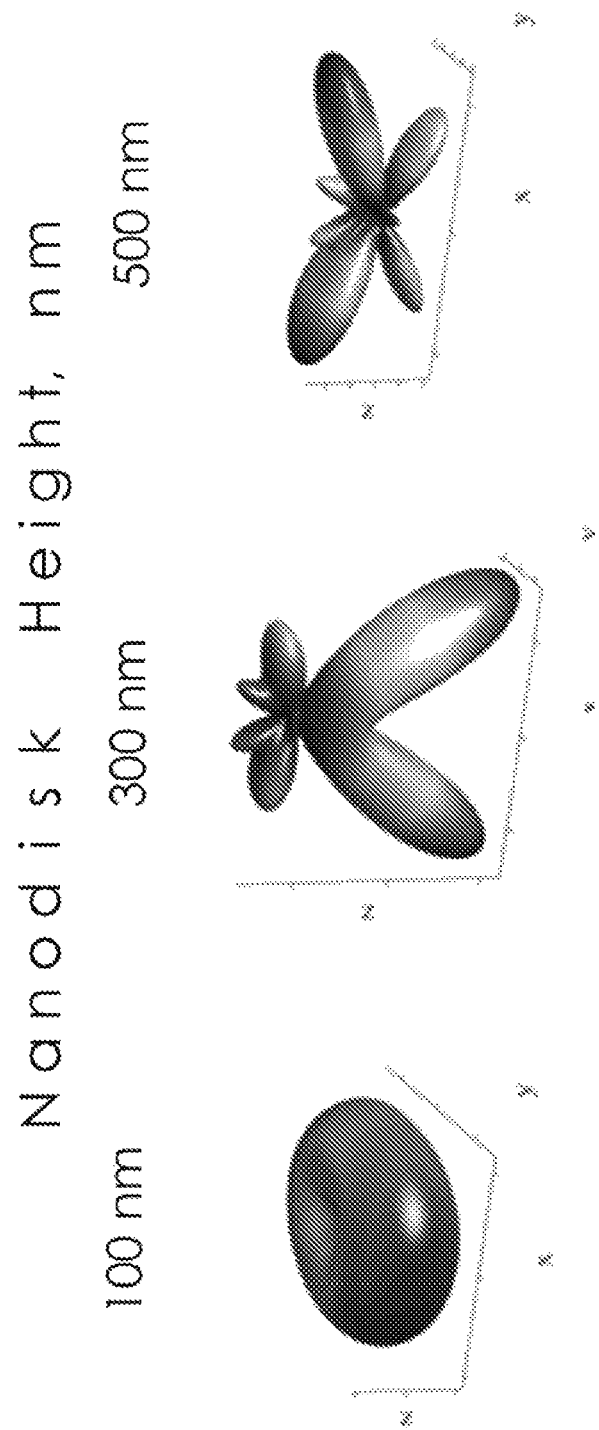
FIG. 42 shows the calculated SH directionality for an island diameter of 490 nm and an island height of 100, 300, and 500 nm, respectively.

The strong dependence of SH directionality on cylindrical island height is demonstrated by the directionality diagrams of FIG. 42 for cylindrical semiconductor islands of 490 nm diameter and heights of 100 nm, 300 nm and 500 nm.

Figure 43:
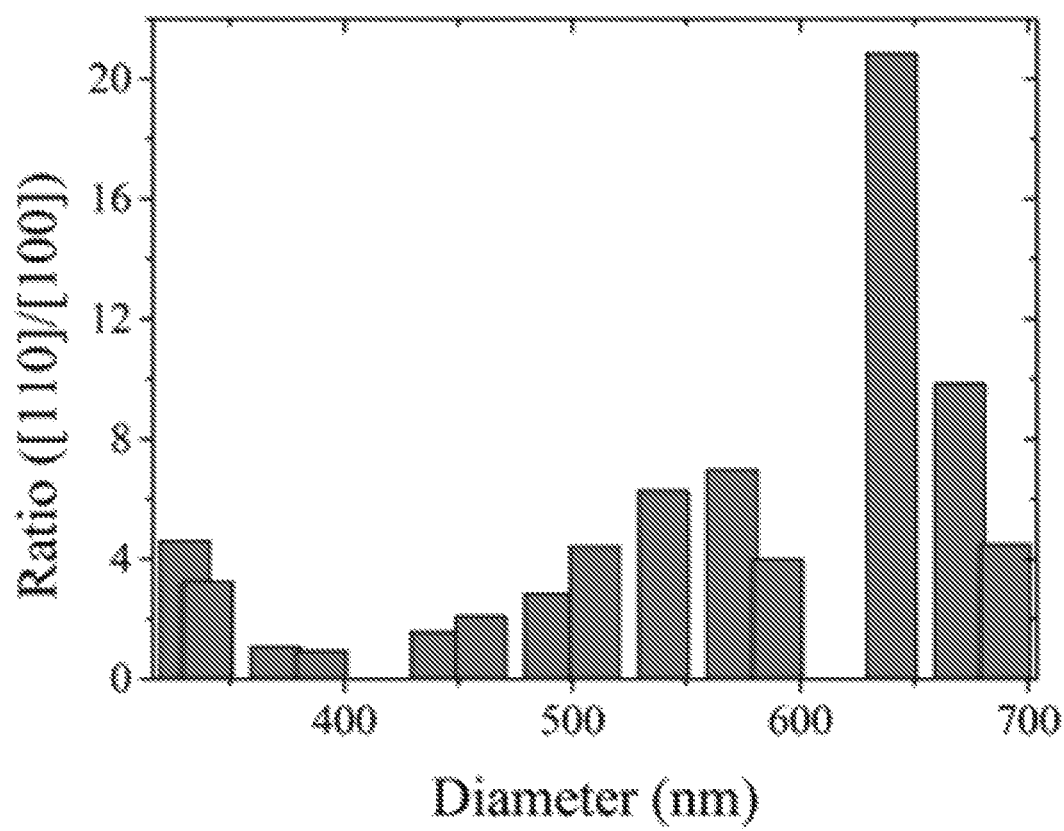
FIG. 43 is a bar chart of the efficiency of second harmonic generation polarization orientation with respect to the crystalline axis as a function of island diameter.

The strong dependence of SH efficiency on the relative orientation of the in-plane crystalline axis to the orientation of pump polarization is shown in FIG. 43.

Figure 44:
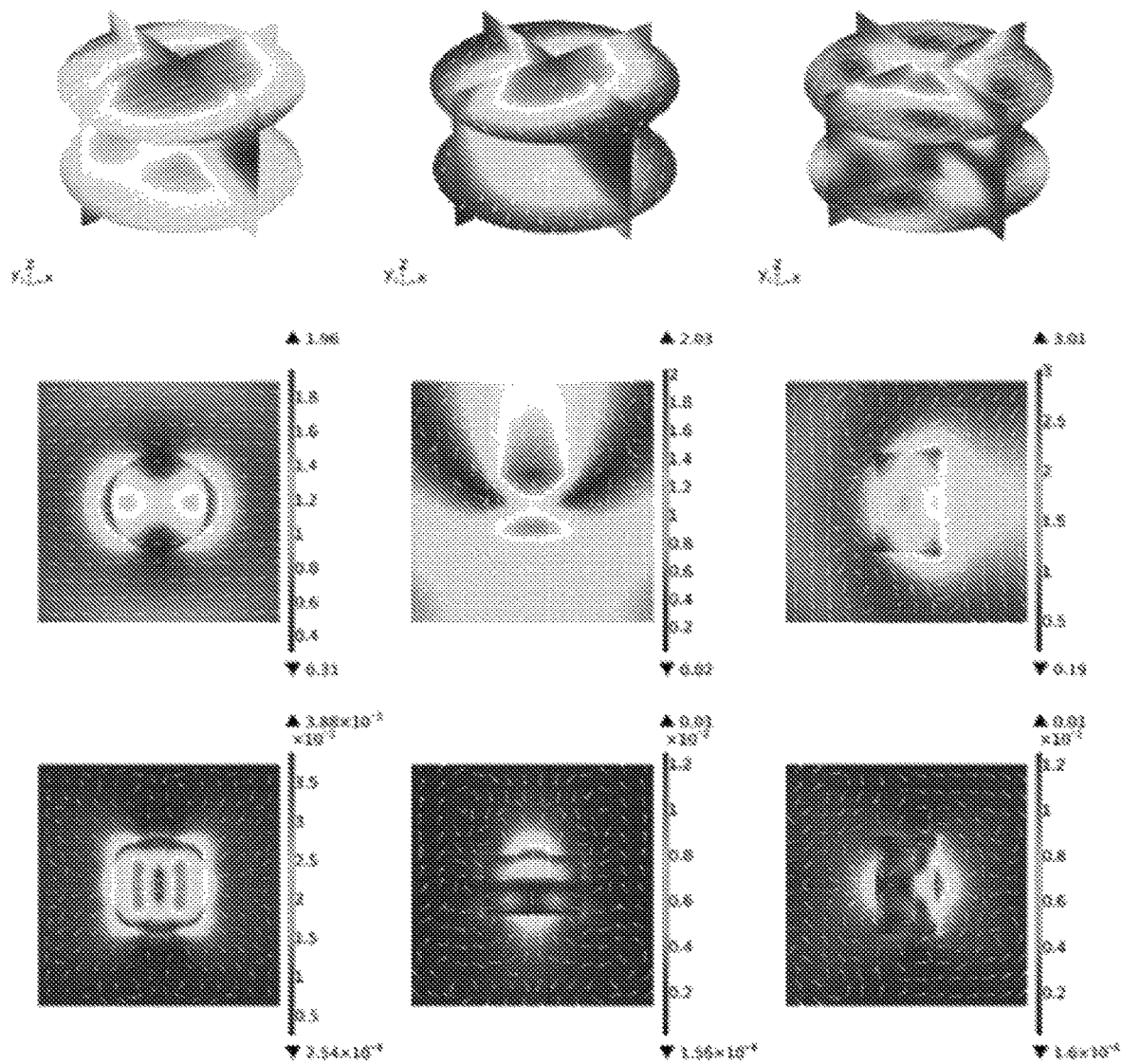
FIG. 44: First row: spatial profiles of the fundamental field (left), induced nonlinear current (center), and second-harmonic field (right) inside a semiconductor island of 490 nm diameter; near-field distributions of the fundamental (second row) and SH (third row) fields shown in three different cross-sections.

Finally, distributions of the near-fields at both the pump wavelength and the second harmonic wavelength are shown in FIG. 44.

Conversion Enhancement Using a Pump Beam

In order to enhance the efficiency of frequency/wavelength conversion from the input radiation to the output radiation (of a wavelength shorter than the wavelength of the input radiation), embodiments of the present invention use a 'pump' beam of (e.g., laser) radiation, as described below. At the risk of confusion, in order to better represent the causal relationship between the three sources and wavelengths of radiation, and the effective generation of the output radiation from the two sources of input radiation, in the following description, the supplied pump radiation is described as having a first (or pump) wavelength $\lambda_1$ or angular frequency $\omega_1$, the incident radiation that is to be converted (generally referred to for convenience in the following description as the "input" radiation or the "signal") is described as having a second wavelength $\lambda_2$ or angular frequency $\omega_2$, and the resulting output radiation is described as having a third wavelength $\lambda_3$ or angular frequency $\omega_3$.

Figure 45:
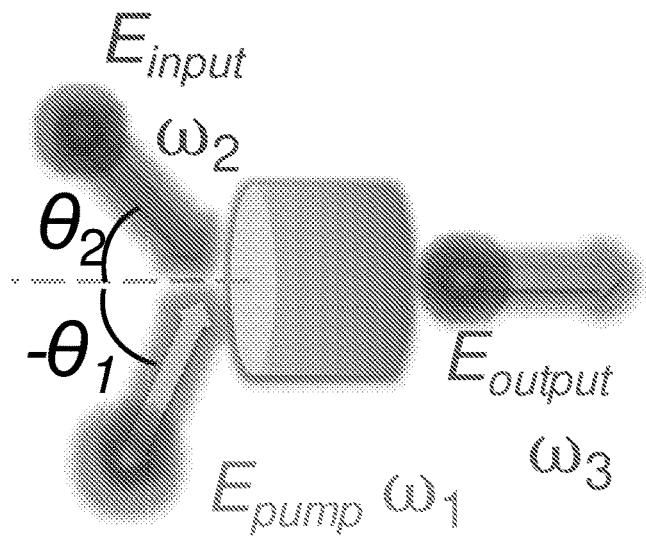
FIG. 45 is a schematic diagram illustrating the use of a pump beam to increase the efficiency of frequency conversion in accordance with embodiments of the present invention.

FIG. 45 is a schematic diagram illustrating the general arrangement for frequency conversion, wherein a pump beam of a first angular frequency $-\omega_1$ is incident upon a single semiconductor island (which will typically be one island of a two-dimensional array of semiconductor islands) at an angle $-\theta_1$ relative to the surface normal of the island (or to the two-dimensional plane of islands). Input radiation of the second angular frequency $\omega_2$ is also incident upon the semiconductor island (or array of semiconductor islands) at a second angle $\theta_2$. Together, the two sources of input radiation incident upon the semiconductor island (or array of semiconductor islands) cause the semiconductor island(s) to generate output radiation of the third angular frequency $\omega_3$, shown in the figure as being emitted in a generally forward direction and normal to the semiconductor island (or plane of semiconductor islands).

In general, there are different mechanisms that can be used to frequency convert the input radiation of the second angular frequency $\omega_2$. In one mechanism, referred to as sum frequency generation or "SFG" and illustrated schematically in the left-hand side of FIG. 46, the pump beam and the input radiation effectively combine so that the frequency of the output radiation is given by $\omega_3=\omega_1+\omega_2$, and the wavelength of the output radiation is therefore given by $$\lambda_3 = \frac{\lambda_1 \lambda_2}{\lambda_1 + \lambda_2}.$$

Figure 46:
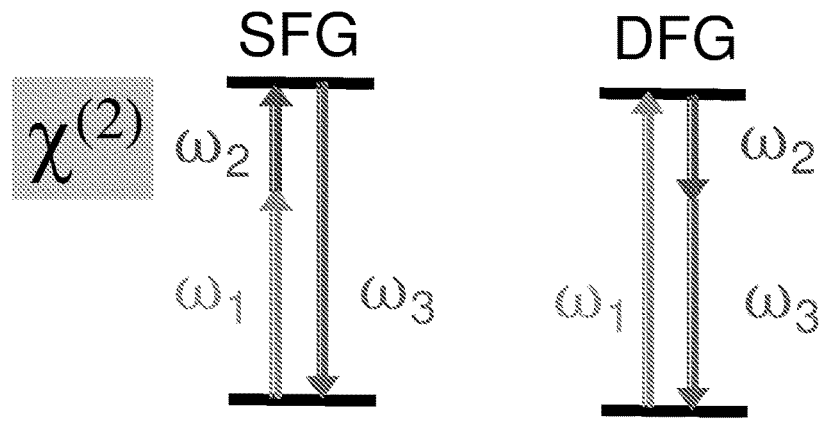
FIG. 46 is a schematic illustration of energy conservation in sum frequency generation (FFG) and difference frequency generation (DFG) processes in accordance with FIG. 45.

In a second mechanism, known as difference frequency generation, or "DFG" and illustrated schematically in the right side of FIG. 46, the output frequency is given by the difference between the two input frequencies, i.e.: $\omega_3=\omega_1-\omega_2$, and therefore $$\lambda_3 = \frac{\lambda_1\lambda_2}{\lambda_2 - \lambda_1}.$$

Night Vision

Figure 47:
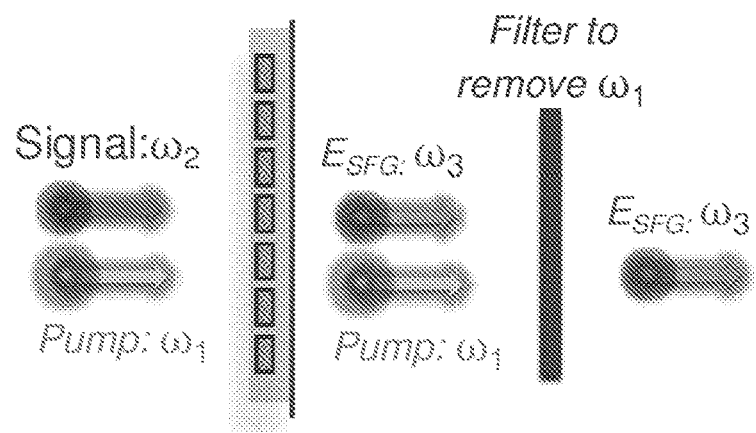
FIG. 47 is a schematic diagram illustrating the use of a filter to remove a remaining portion of the pump beam transmitted through an array of semiconductor islands in accordance with some embodiments of the present invention.

The use of a pump beam to increase the efficiency of frequency conversion is well suited to thermal imaging and night vision applications. FIG. 47 is a schematic diagram illustrating the operation of a night vision apparatus in which pump beam of frequency $\omega_1$ and a short wave infrared ('SWIR', $\lambda$=900-2500 nm) signal of frequency $\omega_2$ are incident upon a two-dimensional array of semiconductor islands at normal or near-normal incidence. Responsive to the incident radiation, the array generates output radiation of a frequency $\omega_3=\omega_1+\omega_2$ by an SFG process. In embodiments where a portion of the infrared pump beam passes through the array of semiconductor islands and is substantially co-linear with the output radiation, the remaining portion of the infrared pump beam can be removed by a filter to provide output radiation that consists substantially only of visible radiation of frequency $\omega_3$ corresponding to the input signal, which can then be directed onto the naked eye, or alternatively to a light or imaging sensor (not shown), or an image intensifier or other optical processing component for amplification and/or further processing. In the case of night vision, a DFG process requires the pump beam to be in the visible region of the electromagnetic spectrum, whereas an SFG process allows the pump beam to be in the infrared, which can be advantageous as it is not visible to the human eye.

Figure 64:
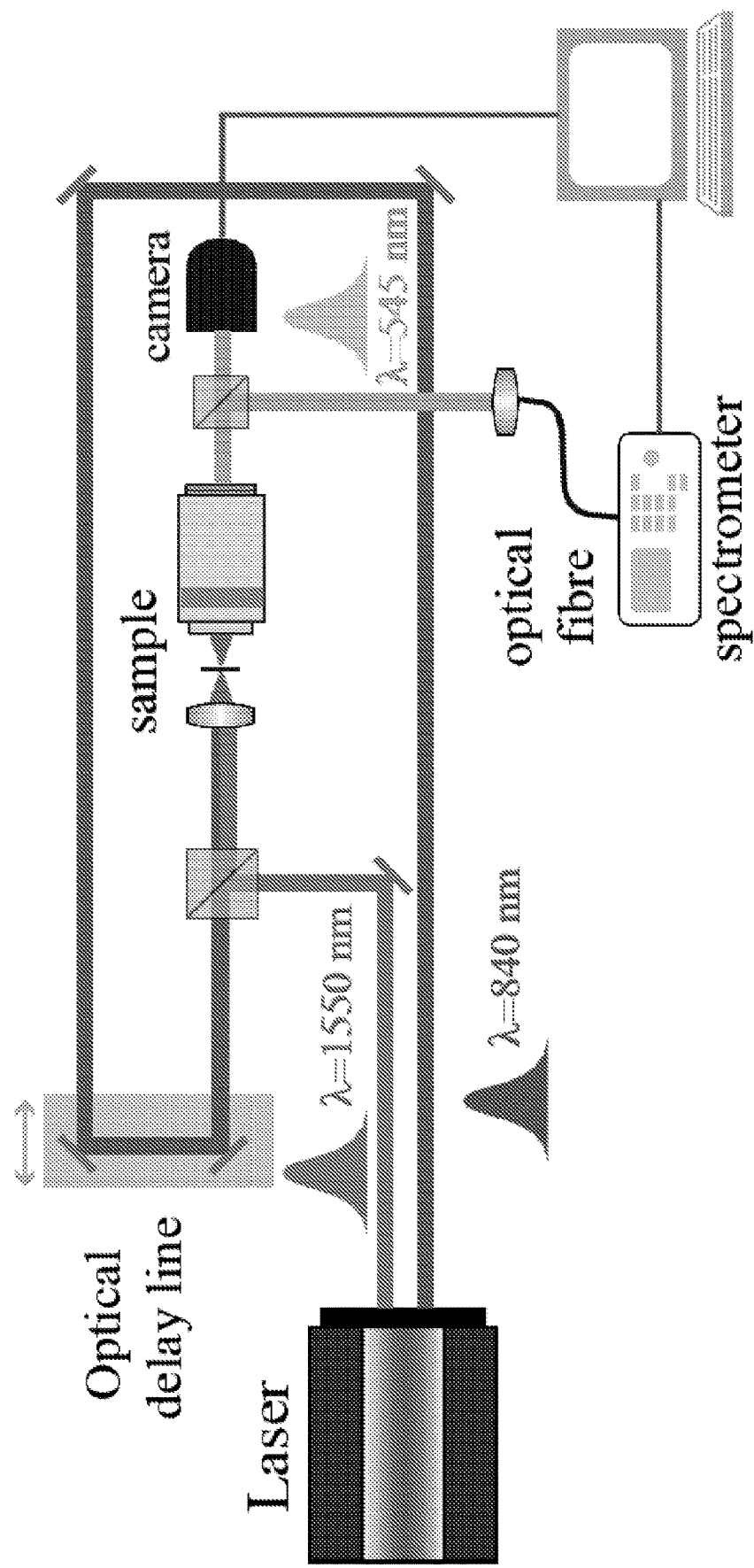
FIG. 64 is a schematic diagram of an apparatus used to characterise the non-linear optical properties of a semiconductor island in transmission and under illumination by a pump beam.

The light emitted by an array of semiconductor islands in a forward direction under illumination by a pump beam was measured using an optical characterisation apparatus as shown schematically in FIG. 64. For example, FIG. 65 is a graph showing the measured optical spectrum of the output of a an array of semiconductor islands configured for night vision using an 840 nm pump beam and a 1550 nm input signal, both of these wavelengths having being removed from the output by optical filters. The array was a 100 μm×100 μm array of cylindrical AlGaAs islands of height 300 nm, diameter 440 nm and (centre to centre) pitch 850 nm, and were embedded in a BCB layer on a glass substrate.

A sharp peak at the sum frequency (SFG) of 544 nm dominates the spectrum, with minor contributions from other non-linear conversion processes, namely four wave mixing (FWM) at 575 nm and third harmonic generation (THG) at 517 nm. As will be apparent to those skilled in the art, the FWM and THG wavelengths could easily be removed by adding suitable filters, if required.

In some embodiments, as described below, the pump beam can be directed along the two-dimensional array of semiconductor islands, rather than normal to it, and is thus orthogonal or substantially orthogonal to the input signal, as shown schematically in FIG. 49(b).

Any remaining portion of the pump beam is thus spatially separate from the output signal, and consequently a filter is not generally required. Additionally, with this arrangement, the pump beam can illuminate all of the semiconductor islands in the array whilst also being as narrow as possible over the entire length of the array, thereby increasing the pump beam intensity and correspondingly the efficiency of the frequency conversion.

In some embodiments, the pump beam is directed at an oblique angle (i.e., between the two extremes of normal and parallel incidence) relative to the two-dimensional plane of the array of semiconductor islands. Depending on the angle of incidence, the remaining portion of the pump beam can be spatially separate from the output signal, obviating the need for an IR filter.

For example, FIG. 66 includes a schematic side view of a frequency conversion device in which an array of semiconductor islands (not shown) was embedded in a 4 μm BCB layer on an MgF$_2$ substrate so that an 840 nm pump beam incident along the plane of the BCB layer was confined by waveguiding in the BCB layer containing the semiconductor islands. In order to demonstrate the confinement of the pump beam, an imaging camera was placed as shown and produced the image shown in the lower part of the Figure. The image shows a portion of the pump beam confined within the BCB layer, and another portion (due to imperfect coupling) propagating within the MgF$_2$ substrate".

Because the array of semiconductor islands and the support are both transparent at visible wavelengths, a night vision apparatus of this type also transmits a large proportion of incident visible light. For example, FIG. 67 is a graph of optical transmission through a frequency conversion device array and substrate as a function of wavelength. In this example, cylindrical AlGaAs islands of height 300 nm and diameter 440 nm and (centre to centre) pitch 850 nm (the same array as FIGS. 65, 67 and 68) were embedded in a BCB layer on a glass substrate. The data shows transmission in excess of 80% at all wavelengths across the visible spectrum (400 to 700 nm).

The night vision apparatus can be wearable, and can take the form of eyeglasses or a visor, for example, or can be part of or attached to a weapon or vehicle or a heads up display or window. Many other suitable forms will be apparent to those skilled in the art in light of this disclosure.

The efficiency of the apparatus depends upon a variety of factors, including the crystalline orientation of the semiconductor islands and the angle of incidence of the pump beam of radiation, which also affect the directivity of emission from the semiconductor islands.

The SFG and DFG nonlinear interactions are dependent upon a material property known to those skilled in the art as the second order non-linear susceptibility, $\chi^{(2)}$, which is highly dependent on the symmetry of the semiconductor crystallographic lattice. Semiconductors grown with different lattice orientations (e.g., [111], [110], [100], [102], etc) are characterised by different second second-order nonlinear susceptibility tensor components ($\chi_{ijk}^{(2)}$). For instance, in the principal-axis system of the crystal, the ith component of the nonlinear polarization at the SH frequency is given by:

$$P_i^{(2\omega)}=\varepsilon_0\chi_{ijk}^{(2)}E_j^{(\omega)}E_k^{(\omega)}$$

with similar equations for the jth and kth components. Importantly, the angular direction of the nonlinear emission is highly dependent upon non-zero elements of the matrix of nonlinear susceptibility tensors.

Figure 48:
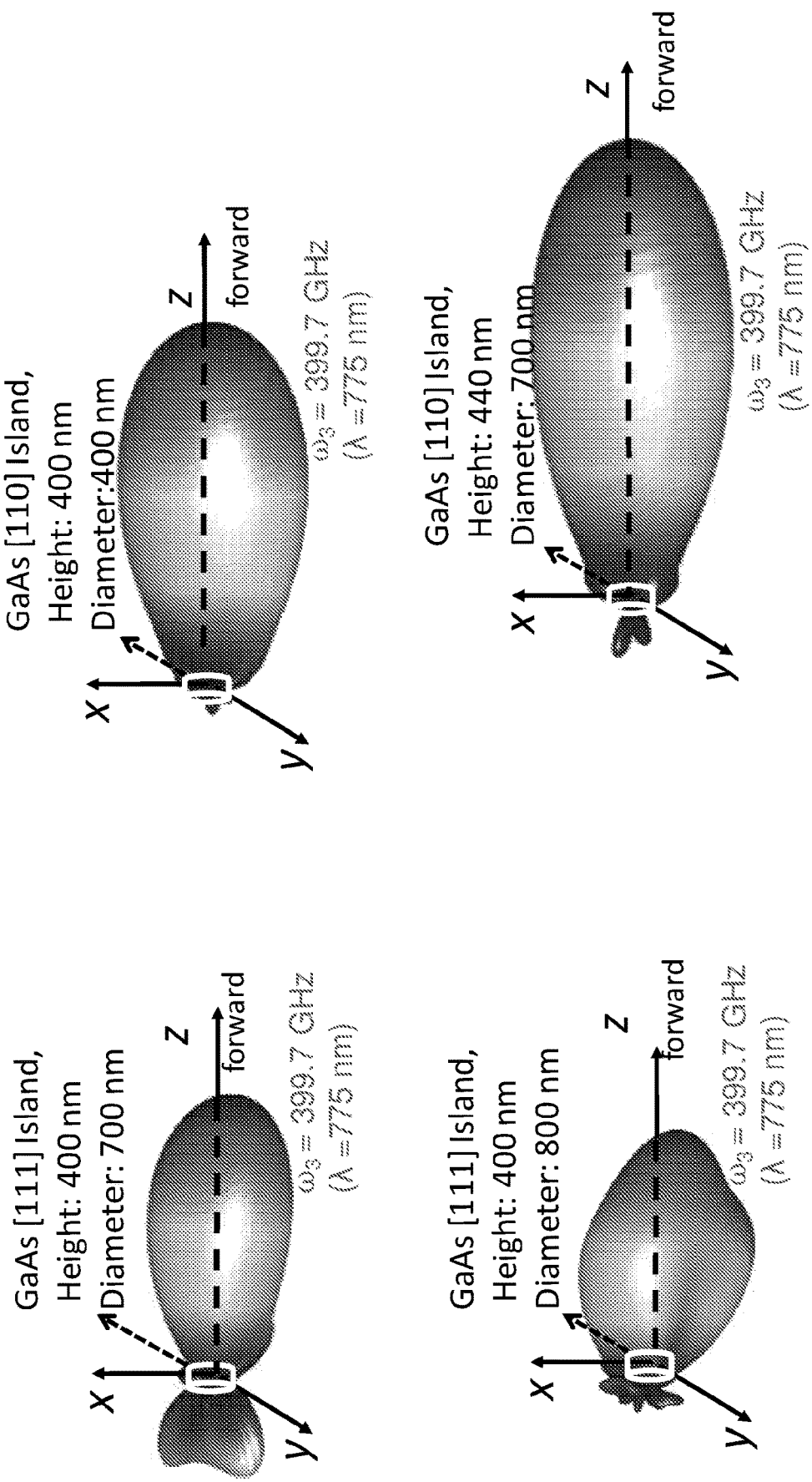
FIG. 48 includes four plots representing the three-dimensional spatial distribution of visible light emission from a semiconductor island having either a [111] crystal orientation (left-hand plots) or a [110] crystal orientation (left-hand plots) and being in the form of a cylinder having a height of 400 nm and a diameter of either ≈700 nm (upper plots) or 800 nm (lower plots)

Semiconductor islands with [110] or [111] crystallographic orientations emit output radiation in directions normal to the substrate (i.e., to the plane of the two-dimensional array) because they are characterised by non-zero diagonal elements in the matrix of second-order nonlinear susceptibility tensors. Consequently, these orientations support the general operation illustrated schematically in FIG. 46. For example, FIG. 48 shows the results of numerical simulations generated by COMSOL for GaAs semiconductor islands having either a [111] crystal orientation (left-hand plots) or a [110] crystal orientation (left-hand plots) and in the form of cylinders having a height of 400 nm and a diameter of either ≈700 nm (upper plots) or 800 nm (lower plots). As can be seen, all of these configurations are effective for generating an output beam that is preferentially emitted in the forward direction. Additionally, the use of islands with non-cylindrical shapes can be used to further enhance this strong directivity in emission, especially those exhibiting strong Fano-type resonances, which can strongly enhance conversion efficiency.

Figure 49:
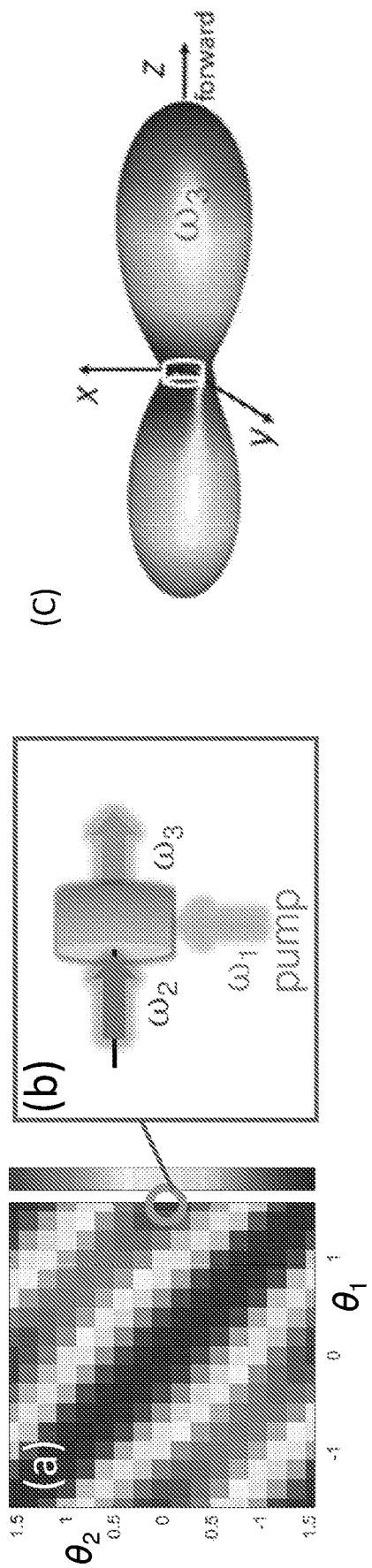
FIG. 49(a) is a two-dimensional plot representing the calculated forward SFG conversion efficiency of a semiconductor island as a function of the angles of incidence of the pump beam (horizontal axis) and the signal beam (vertical axis) relative to the surface normal of a cylindrical [100] AlGaAs island having a height of 400 nm, and a diameter of 430 nm.
FIG. 49(b) is a schematic diagram illustrating one of the beam configurations providing the highest conversion efficiency, corresponding to the circled region of FIG. 49(a)
FIG. 49(c) is a plot illustrating the strong forward directivity of the calculated emission for the configuration of FIG. 49(b)

FIG. 49 (a) is a plot representing the forward SFG conversion efficiency calculated by COMSOL as a function of the angles of incidence of the pump beam (horizontal axis) and the signal beam (vertical axis) relative to the surface normal of a cylindrical [100] AlGaAs island having a height of 400 nm, and a diameter of 430 nm. The plot demonstrates the strong dependence on the forward conversion efficiency as a function of these two angles, with one of the configurations providing the highest conversion efficiency (indicated in the plot by a circle) being that shown in FIG. 49(b), where the input signal is normal to the [100] surface of the island and orthogonal to the pump beam (which would be directed along the plane of islands in a two-dimensional array). FIG. 49(c) is a plot illustrating the strong forward directivity of the calculated emission for this configuration, despite the fact that the pump beam is propagating in an orthogonal direction. As described above, this configuration can be particularly advantageous for night vision applications, at least because the pump beam can illuminate all of the islands in a two-dimensional array, and because the pump beam and the output beam are spatially separated.

As described above, the pump beam can be confined within the thin film support containing the semiconductor islands, and which serves as a waveguide. The waveguiding of the pump beam is enabled by the higher refractive index of the polymer layer with respect to the surrounding environment. The presence of the semiconductor islands can cause some scattering of the pump laser. However, even this scattering can be fully contained inside the support film when the semiconductor islands are arranged as a periodic lattice to form what is referred to in the art as a photonic crystal, which supports propagating Bloch waves. These propagating Bloch waves are fully confined inside the planar support, as described in many publications, for example J. B. Pendry and A. MacKinnon, "Calculation of photon dispersion relations," Physical Review Letters 69, 2772-2775 (1992); R. S. Savelev, D. S. Filonov, P. V. Kapitanova, A. E. Krasnok, A. E. Miroshnichenko, P. A. Belov, and Y. S. Kivshar, "Bending of electromagnetic waves in all-dielectric particle array waveguides," Applied Physics Letters 105, 181116 (2014); M. Bakker, Y. F. Yu, R. Paniagua-Domínguez, B. Luk'yanchuk, and A. I. Kuznetsov, "Resonant Light Guiding Along a Chain of Silicon Nanoparticles," Nano Letters DOI: 10.1021/acs.nanolett.7b00381 (2017).

Figure 50:
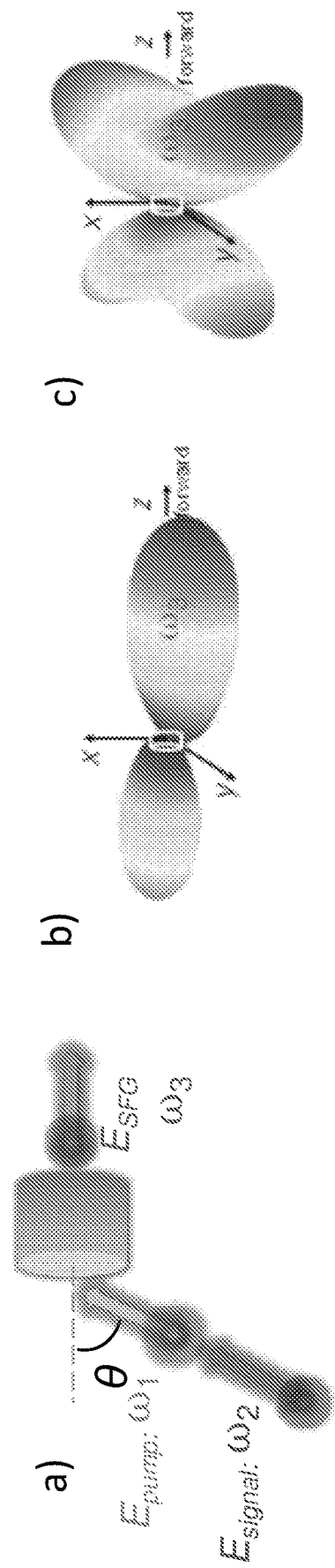
FIG. 50 includes (a) a schematic illustration of beam configurations wherein the pump and signal beams are co-linear, and plots representing the three-dimensional spatial distributions of visible light emission from the semiconductor island when the common angle of incidence is (b) 45°, and (c) 0°.

For comparison, FIGS. 50 (b) and (c) are plots illustrating the emission directivity for configurations where both the pump beam and the signal are incident at angles of 45° and 0°, respectively, relative to the surface normal of the [100] AlGaAs Island, as shown in FIG. 50(a). The dual 45° configuration provides a similarly strong forward directivity as the orthogonal beam configuration, whereas the 0° configuration produces very little emission in the forward direction.

The numeric simulations described above are for single semiconductor islands. However, numerical simulations also demonstrate that both the directivity and the SFG efficiency can be significantly increased when multiple semiconductor islands are provided in a two-dimensional array, as shown in the left-hand side of FIG. 51. The inventors have also determined that the forward SFT efficiency is strongly dependent upon not only the pump and signal beam angles, but also their polarisations, as illustrated in the right-hand side of FIG. 51.

Figure 52:
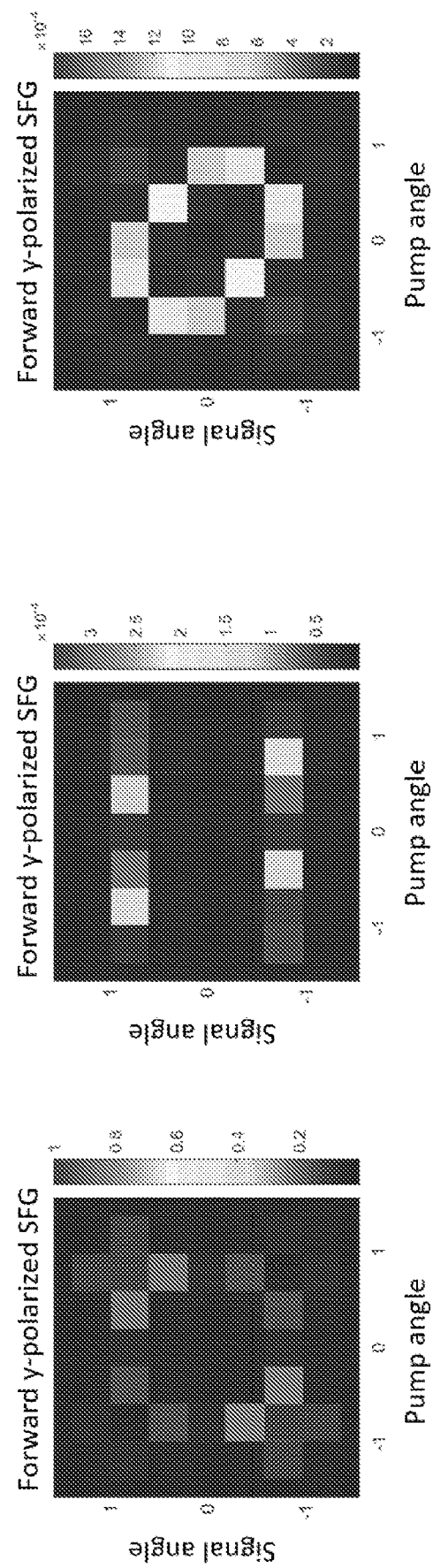
FIG. 52 includes 32-dimensional plots representing the calculated forward SFG efficiency of a two-dimensional array of semiconductor islands having a lattice period of 695 nm is a function of the angles of incidence of the pump beam and the signal beam for respective beam polarisations wherein the signal and pump beams are both ss-polarised (left-hand plot), ps-polarised (middle plot), and pp-polarised (right plot)

FIG. 52 includes three two-dimensional plots of the calculated forward SFG efficiency for a two-dimensional array of the AlGaAs islands described above at an array lattice period of 685 nm, and as a function of both the pump beam angle and the signal beam angle for the three different polarisation configurations of: (i) ss-polarised pump and signal beams (left-hand plot), (ii) ps-polarised pump and signal beams (middle plot), and (iii) pp-polarised pump and signal beams (right-hand plot).

Figure 53:
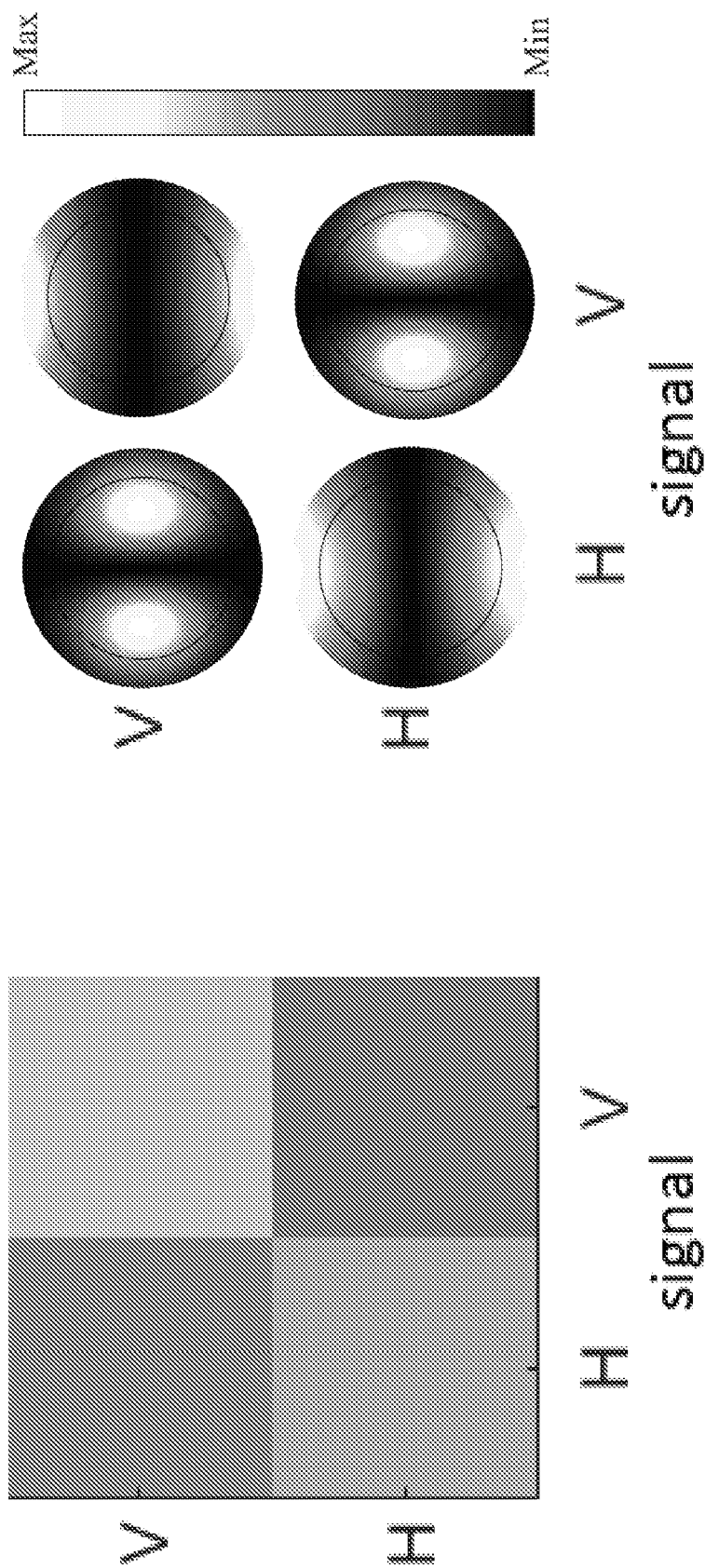
FIG. 53 includes: (left-hand side) a calculated efficiency diagram for emission from a single semiconductor island and H-polarised SFG at 770 nm for four different combinations of polarisation (HH, HV, VH, and VV); and (right-hand side) a set of SFG directivity diagrams for the same polarisation combinations.

FIG. 53 demonstrates the polarization capabilities of the semiconductor islands. For the purpose of the following comparison with experimental demonstration, the calculations are shown for backward SFG, however as can be seem from FIG. 50, the forward SFG is expected to be very similar. The left-hand side of this figure is a calculated efficiency diagram showing the total backward SFG power for the emission from the single AlGaAs semiconductor island described above. The calculation is performed for SFG at 770 nm with all beams normal to the semiconductor islands surface (thus requiring that the reflected portion of the pump beam be filtered out), and for the combinations of pump beam and signal beam polarisations indicated (HH, HV, VH, and VV). These simulation results are for SFG from a 400 nm-high and 420 nm-wide cylindrical AlGaAs nano-disk on an AlOx substrate in reflection.

The highest SFG conversion efficiency is observed when the polarizations of both signal and pump arms are V-polarized, producing horizontally polarised output radiation. The right-hand side of FIG. 53 shows the calculated directivity for the input polarisation combinations, showing that the resulting SFG radiation patterns strongly depend on the signal and pump beam polarizations.

The numerical simulations predict that the conversion efficiency will increase dramatically when the pump beam is propagating perpendicular to the signal beam and to the resulting sum-frequency beam, as shown in FIG. 49, with further increases expected from the utilisation of Fano-resonances and from using an array of multiple semiconductor islands.

Figure 54:
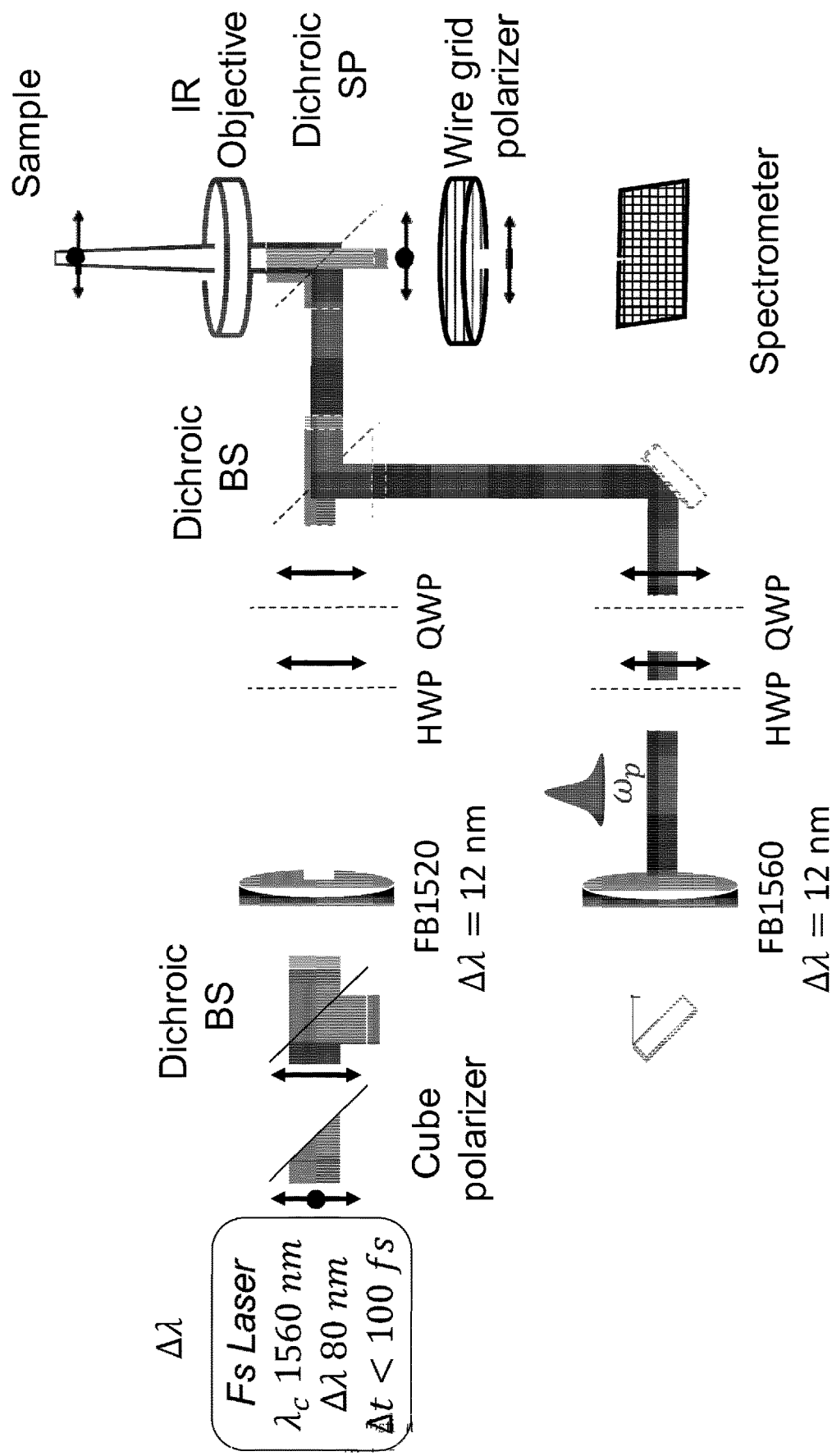
FIG. 54 is a schematic diagram of an apparatus used to characterise the non-linear optical properties of a semiconductor island.
Figure 56:
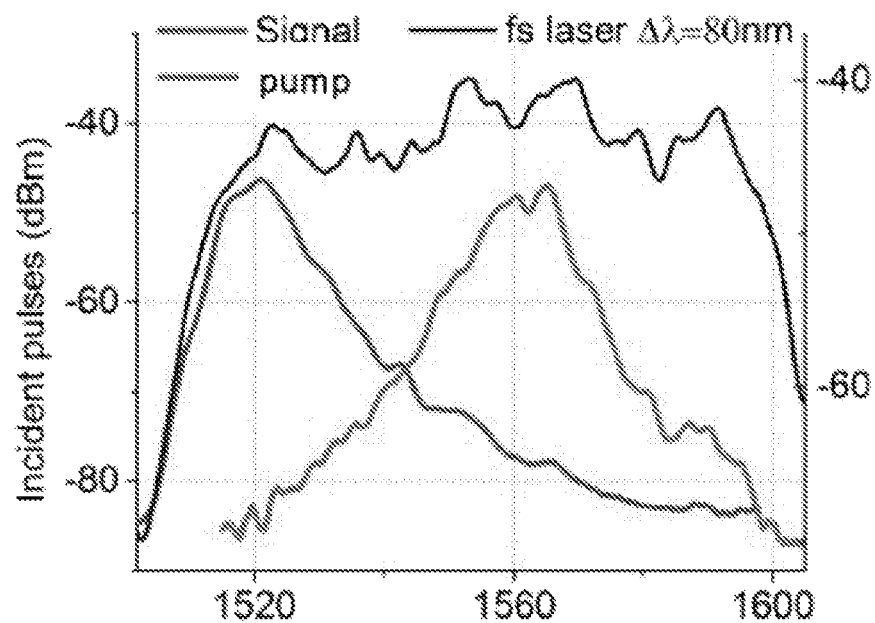
FIG. 56 is a graph showing the wavelength distributions of the pump beam and signal beam that were generated from the femtosecond laser source output (also shown)

The efficacy of the frequency conversion devices described above can be demonstrated by measuring the polarization resolved SFG conversion efficiency and radiation diagrams for a cylindrical AlGaAs island on an AlOx substrate as described above, using the apparatus shown in FIG. 54. An 86 fs long (bandwidth of 80 nm) laser pulse was split into two paths: a signal arm with a central wavelength of 1520 nm and a pump arm with a central wavelength of 1560 nm, as shown in FIG. 56. These two beams were recombined (with an average power of 10 mW) and focused onto a single 400 nm-high and 420 nm-wide cylindrical AlGaAs island using a 0.7 NA objective. Half-wave and quarter-wave plates (HWP and QWP) were used to control polarisation in both signal and pump arms.

Figure 55:
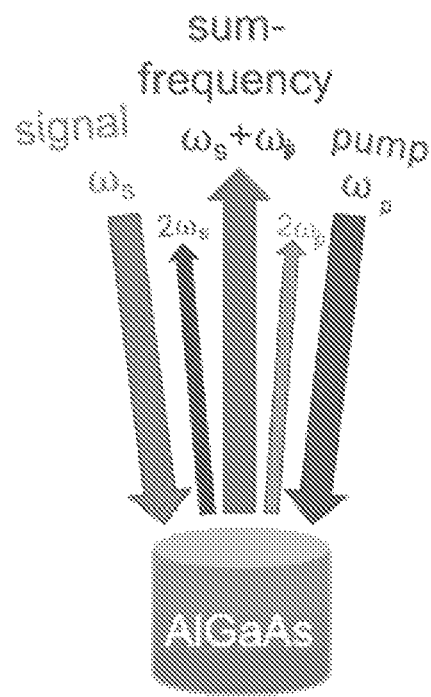
FIG. 55 is a schematic diagram illustrating the beam configuration used in the measurements made using the apparatus of FIG. 54, in which the backward-directed SFG output beam was measured.

After adjusting the optical delay between both arms such that both the signal and pump pulses arrive at the semiconductor island simultaneously, the resulting output radiation was measured in reflection (in the backward direction), as shown schematically in FIG. 55.

Figure 57:
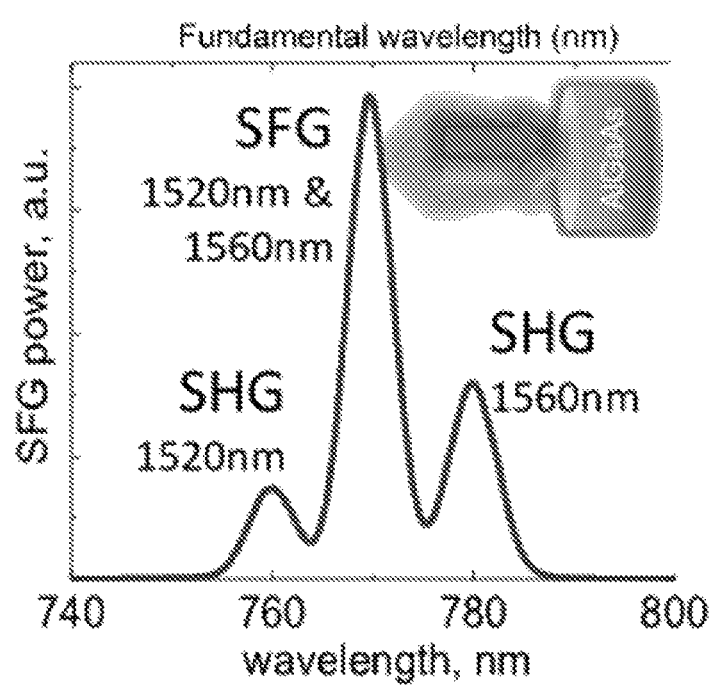
FIG. 57 is a graph showing the measured wavelength distribution of the resulting output of the semiconductor island.

As shown in FIG. 57, three spectral peaks were observed due to nonlinear parametric wave-mixing: one peak at 770 nm corresponding to the SFG, and two other peaks at 760 nm and 780 nm, corresponding to the signal and pump second-harmonic generation (SHG), respectively.

Figure 59:
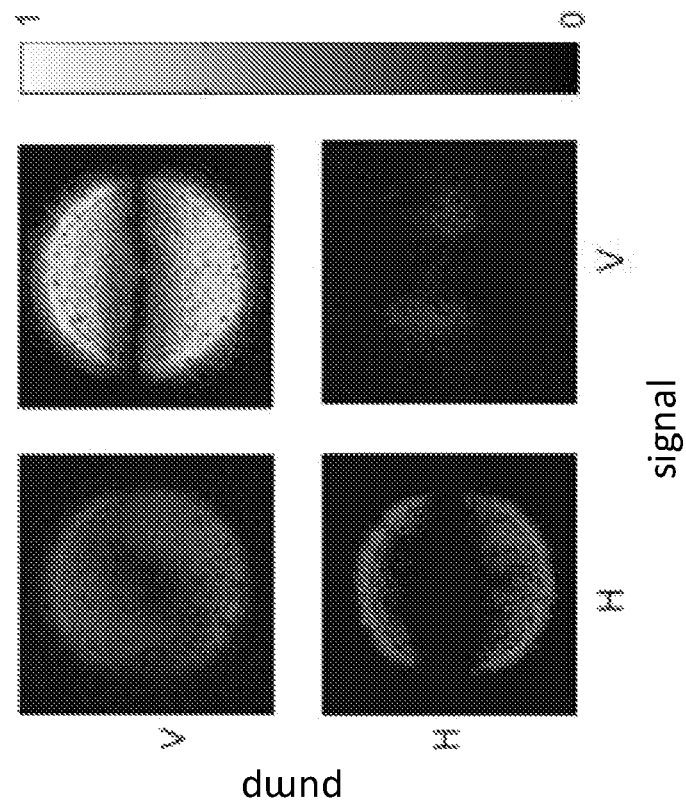
FIG. 59 is a corresponding set of four images representing the directivity of SFG emission for the same polarisation combinations.
Figure 58:
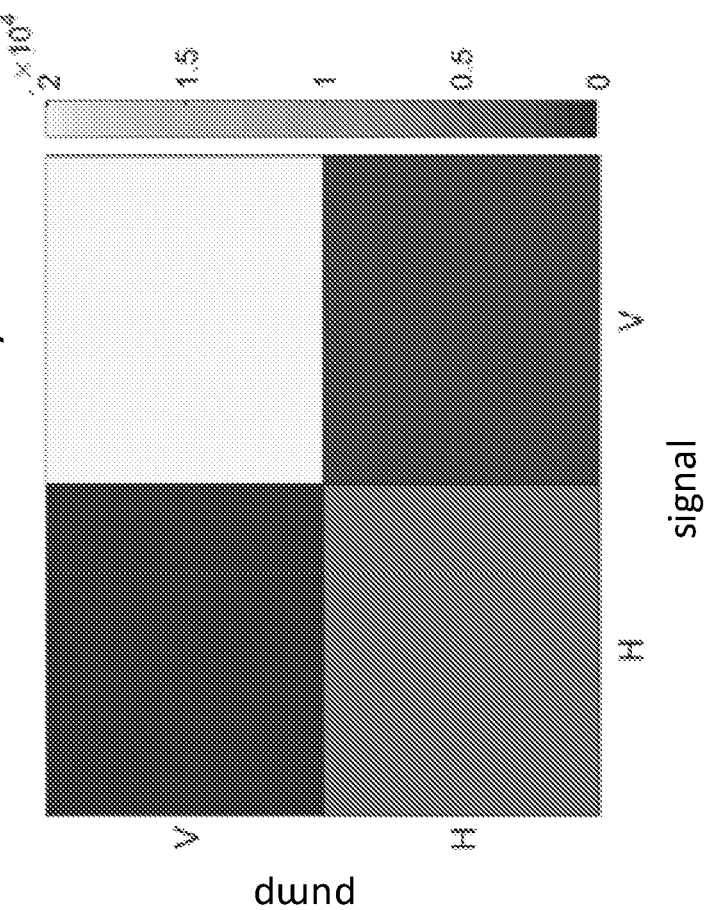
FIG. 58 is a colour map of H-polarised SFG at 770 nm for the polarisation combinations shown.

The measured SFG conversion efficiency was over $10^{-6}$, where the incident average power of the each beam was about 10 mW. The resulting values of SFG power, as measured in counts per second on the CCD Camera at 770 nm, are shown in FIG. 58, and the corresponding SFG radiation patterns measured via a camera and a Fourier imaging system are shown in FIG. 59. The highest SFG conversion efficiency is achieved when the polarizations of both signal and pump arms are V-polarized, providing horizontally polarised output radiation. The strong dependence of the SFG radiation on the signal and pump polarization combinations is in good agreement with the numerical simulations described above.

The results discussed above are generally for single semiconductor islands or for arrays of semiconductor islands where each island of the array has the same configuration (i.e., composition, shape and spatial dimensions). However, as described above, an array of semiconductor islands can include semiconductor islands of different configurations (e.g., different compositions and/or dimensions) selected to resonate at different frequencies. This allows different signal frequencies to be mapped or converted to different output frequencies. In the context of a frequency conversion device configured for night vision applications, this allows different frequencies in the infrared region of the electromagnetic spectrum to be mapped to different output wavelengths, preferably in the visible region of the electromagnetic spectrum; i.e., to different colours. Conventional night vision devices are unable to do this, and produce only monochrome images.

Figure 60:
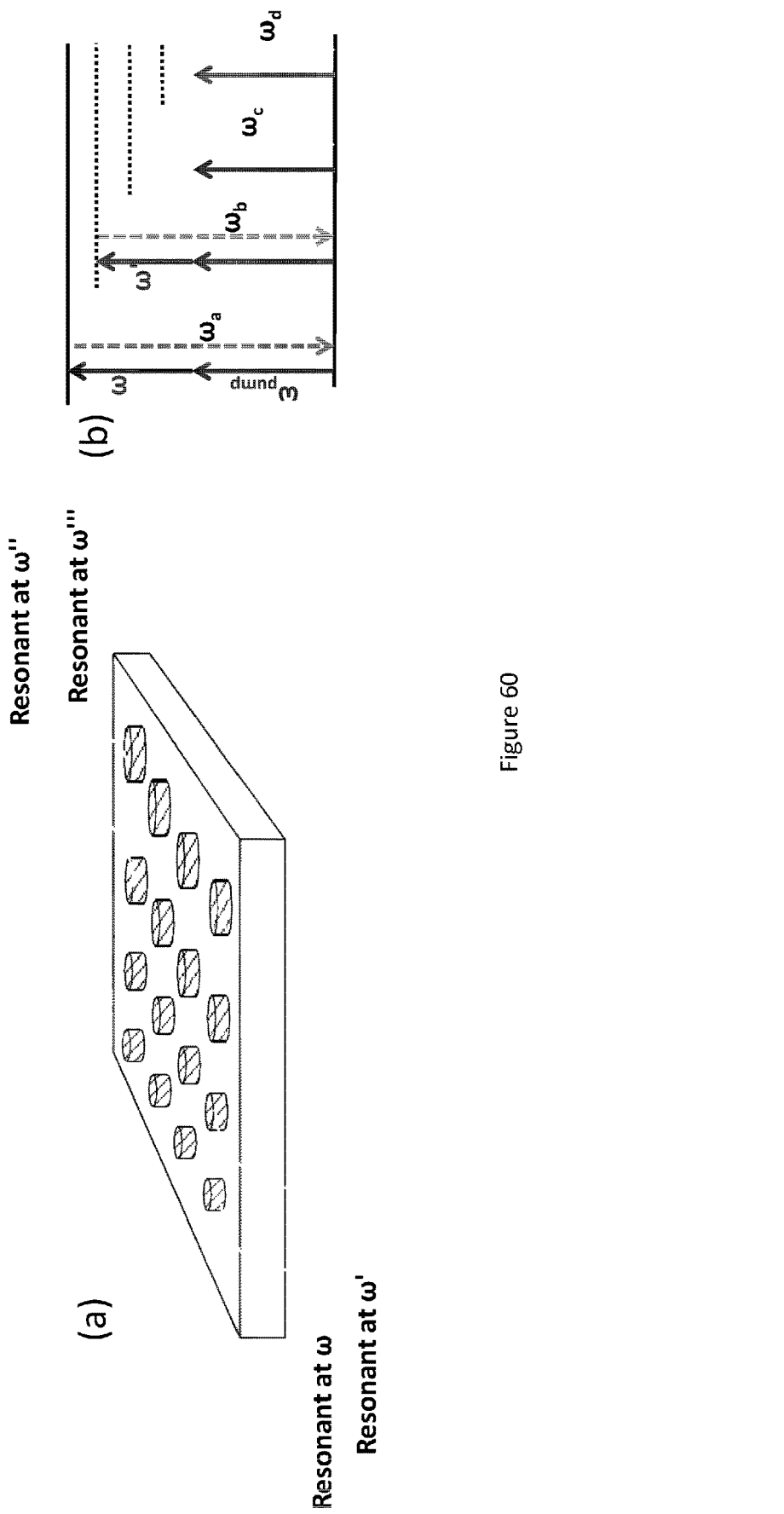
FIG. 60 includes (a) a schematic illustration of a two-dimensional array of semiconductor islands having four different configurations selected to resonate at respective different frequencies, and (b) a schematic illustration of the principle of operation in terms of energy conservation, whereby the different configurations emit different visible colours.

Accordingly, some embodiments of the present invention convert multiple frequencies within the near-infrared (NIR) region of the electromagnetic spectrum into corresponding frequencies in the visible region. Most simply, the resonances of the semiconductor islands can be selected or tuned by corresponding selection of their lateral dimensions (i.e., their diameters in the case of cylindrical islands). For example, FIG. 60 is a schematic illustration of a multi-color frequency conversion device, including cylindrical semiconductor islands of different diameters selected to be resonant at respective different frequencies, $\omega, \omega', \omega''$ and $\omega'''$, generating output radiation of respective different output frequencies $\omega_a, \omega_b, \omega_c,$ and $\omega_d$ by SFG using a single pump frequency, as shown in FIG. 60(*b*).

Figure 61:
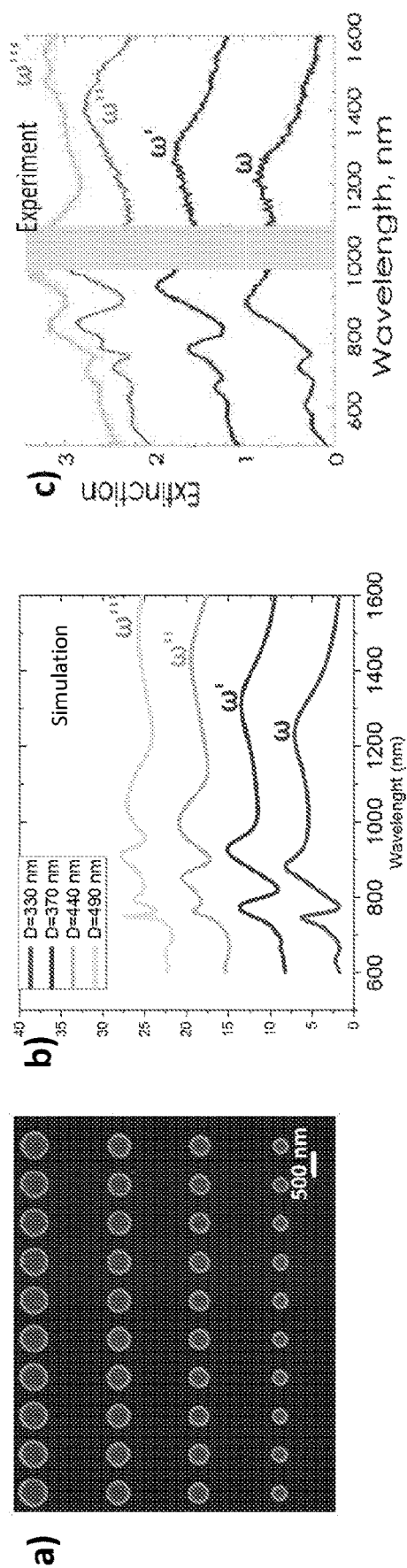
FIG. 61 (a) is a plan-view SEM image of a two-dimensional array of the form represented in FIG. 60(a) and having a height of 300 nm and diameters of 330, 370, 440, and 490 nm.

FIG. 61(*a*) is a scanning electron microscope (SEM) image of a multi-color frequency-conversion device configured to resonate at selected different frequencies. The device includes a two-dimensional array of cylindrical AlGaAs islands with a height of 300 nm and diameters of 330, 370, 400 and 490 nm on a glass substrate. FIGS. 61(*b*) and (*c*) are graphs of the simulated and experimentally measured linear spectra, respectively, showing good agreement between the simulated and measured results. As can be seen, these disks are resonant at $\omega=1250$ nm, $\omega'=1320$ nm, $\omega''=1420$ nm and $\omega'''=1520$ nm, respectively. Therefore, these disks can convert these wavelengths at NIR to various wavelengths at visible range. For example, through SHG process, these disks can convert 1250 nm to 625 nm, 1320 nm to 660 nm, 1420 nm to 710 nm, and 1520 nm to 760 nm, respectively. Importantly, the arrangement of these discs can be designed differently, based on the application. The directivity of emission from the frequency conversion devices is also dependent upon the configuration of the semiconductor islands. Accordingly, individual islands can be configured to be selectively or preferably excited with appropriate amplitudes and sizes so that the collective output of a device containing those islands has a desired directivity. This can be achieved by using numerical simulations to explore the relevant parameter space, followed by the fabrication of prototypes to verify the theoretical predictions. This engineering of directivity can also take into account the corresponding linear scattering to ensure that the frequency conversion device remains transparent at visible wavelengths, thereby allowing normal vision through the device and allowing it to be stacked on top of other layers and/or devices.

Similarly, the support for the semiconductor islands can be configured to achieve a desired directivity. For example, in the case of night vision devices, and in particular for military applications, it is usually desirable for the output radiation to be emitted only in forward directions towards the detector, imaging sensor, or the user's eye, as shown in FIG. 62(*a*), and for the device to not reflect the input signal, so that the night vision device will be invisible to others.

Figure 62:
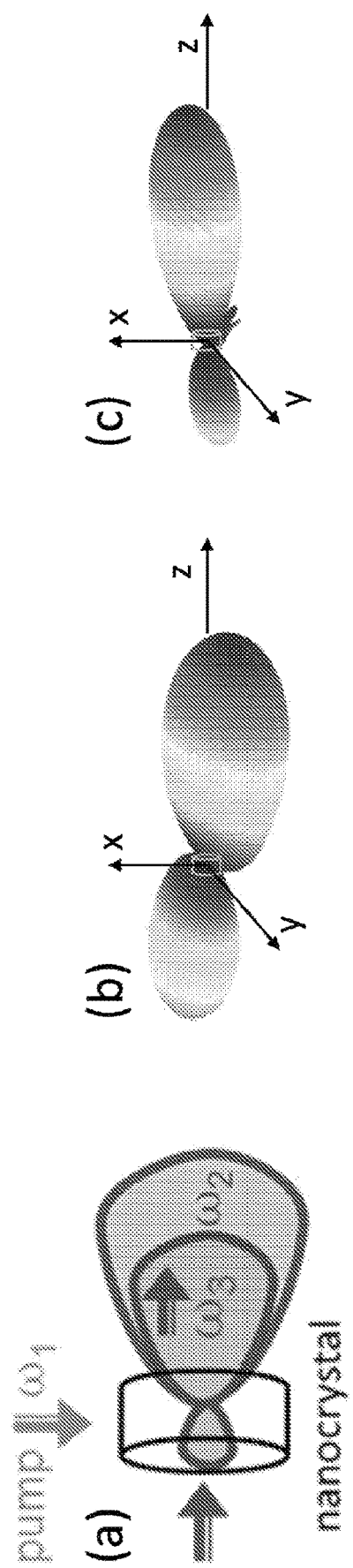
FIG. 62 (a) is a schematic diagram illustrating a beam configuration in which the emissions from a semiconductor island are predominantly directed forward.

For example, FIG. 62(*b*) shows the numerically simulated SFG radiation pattern from an AlGaAs island in air. Although the output radiation is stronger in the forward direction than in the backward direction, the outputs in these directions are nevertheless comparable. However, by attaching the islands to a glass substrate instead of embedding them in the low-index material, the output radiation in the backward direction is substantially attenuated, as shown in FIG. 62(*c*).

Figure 63:
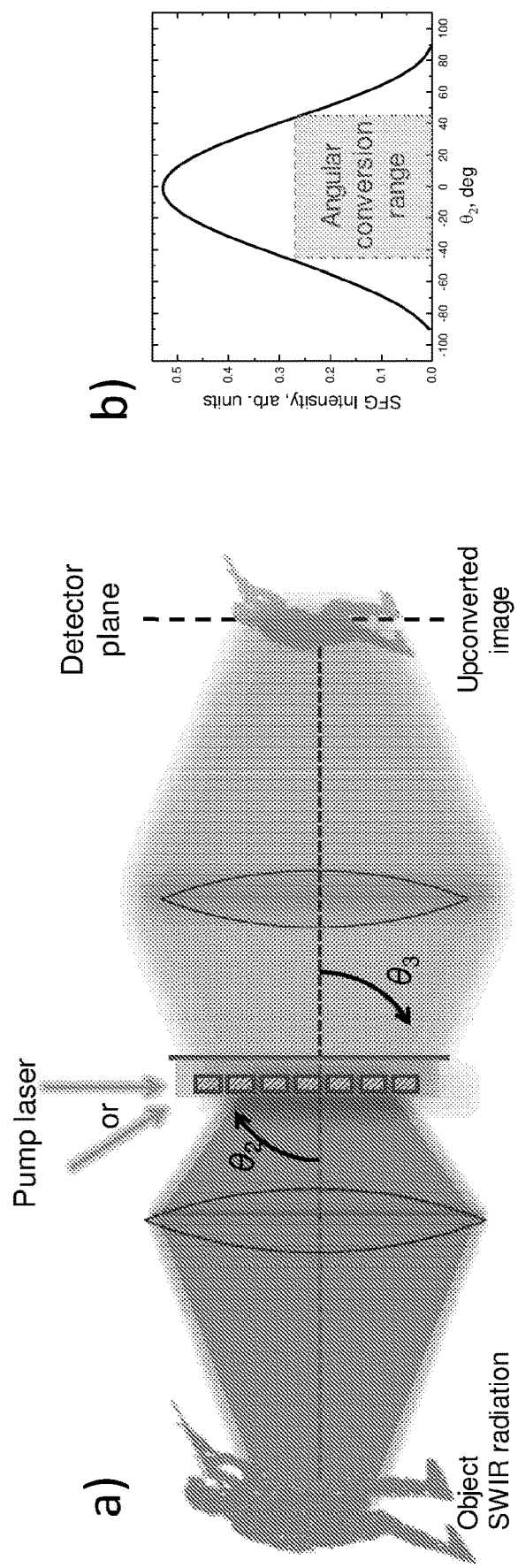
FIG. 63 (a) is a schematic diagram illustrating components of a night vision apparatus in which infrared radiation from an object is at least partially focused onto a two-dimensional array of semiconductor islands pumped by a laser beam propagating either in the plane of the array or oblique to the array, and causing the array to generate corresponding visible light that is focused onto a detector plane.

FIG. 63 is a schematic illustration of a night vision device in which short wave infrared (SWIR) radiation from an object passes through a lens to an array of semiconductor islands as described herein, where the SWIR radiation mixes with a pump laser beam to generate corresponding output radiation in the form of visible light that passes through a second lens to form a visible image of the object.

In order to form the image, the nonlinear frequency conversion has to be efficient for a range of incident angles, because the incident signal (SWIR) image is ultimately composed of different wavevectors. Calculations of the angular acceptance of the SFG process show that the incident angular acceptance range for an array of the AlGaAs islands is ±45°, which is sufficient for paraxial imaging such as the arrangement shown in FIG. 63 (*b*).

The frequency conversion process could also by itself reproduce some of the angular distribution of the input light field, which could further improve the viewing angle and imaging system. It is important however, to keep in mind that the input image could be coherent or incoherent SWIR radiation, therefore, either single island or array lattice effects can play a significant part in SFG image conversion.

Three different sources of SWIR radiation are important for night vision and define different applications of the described night-vision device. In the process of SFG, the intensity of the frequency converted light will be similar to or less than the intensity of the incident SWIR light. By contrast, in a DFG process, amplification of the signal can be achieved simultaneously with frequency conversion, although this may require that the pump laser power is increased by a few orders of magnitude over that used in the SFG process. In general, the intensity of the frequency converted output radiation is proportional to the product of the intensities of the pump beam and the signal beam. The three possible sources of SWIR light are: (i) thermal radiation; (ii) night glow; and (iii) active illumination, meaning that the scene is illuminated by a SWIR light source (such as a laser, LED or light) and the night-vision device detects the reflection of that SWIR light from objects.

For example, FIG. 68 demonstrates the imaging of an object illuminated with infrared light using a frequency conversion device as described above and configured for night vision. In this example, the device included cylindrical AlGaAs islands embedded in a BCB layer on a glass substrate. The islands had a height of 300 nm, a diameter 440 nm and were mutually spaced with a (centre to centre) pitch of 850 nm. A standard optical test image, as shown in the top left image of the Figure, was imaged through an optical microscope using a standard CCD imaging device. The top left image shows the view of the object under standard white light illumination. The top right image shows the same object illuminated by infrared light with a wavelength of 1550 nm and a pump beam with a wavelength of 840 nm, as viewed through the frequency conversion device described above. The horizontal and vertical features of the object are apparent from this image, which is at a wavelength of 544 nm. To confirm the role of the frequency conversion device in generating the image, the lower images showing nothing discernible were acquired under identical conditions except that either the infrared illumination (lower left image) or the pump beam (lower right image) was turned off.

Figure 69:
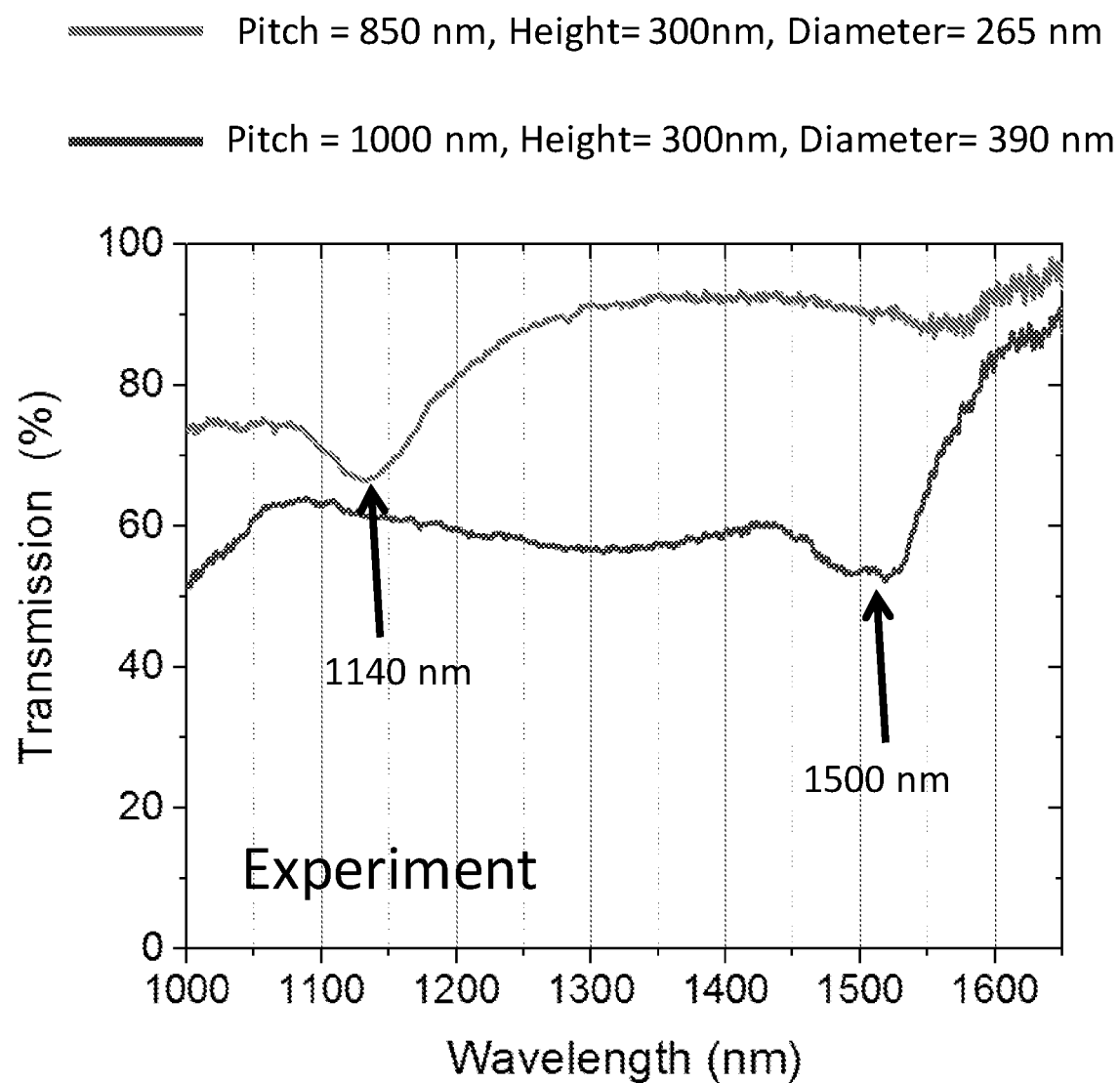
FIG. 69 is a graph showing the transmission spectra from two different arrays of semiconductor islands having different configurations and consequently different resonant frequencies (corresponding to wavelengths of 1140 nm and 1500 nm)

As described above, a frequency conversion device can include semiconductor islands configured to resonate at different frequencies/wavelengths, in a single array and/or in different arrays. For night vision or more generally for thermal imaging, such arrangements can be used to effectively map different infrared wavelengths to different colours in the visible spectrum. For example, FIG. 69 is a graph showing the transmission spectra from two different arrays of semiconductor islands having different configurations. Both arrays are of AlGaAs islands with a height of 300 nm. However, one of the arrays has islands with a diameter of 265 nm and a pitch of 850 nm, which are resonant at 1140 nm (as shown in FIG. 69), while the other array has islands with a diameter of 390 nm and a pitch of 1000 nm, which are resonant at 1500 nm.

Figure 70:
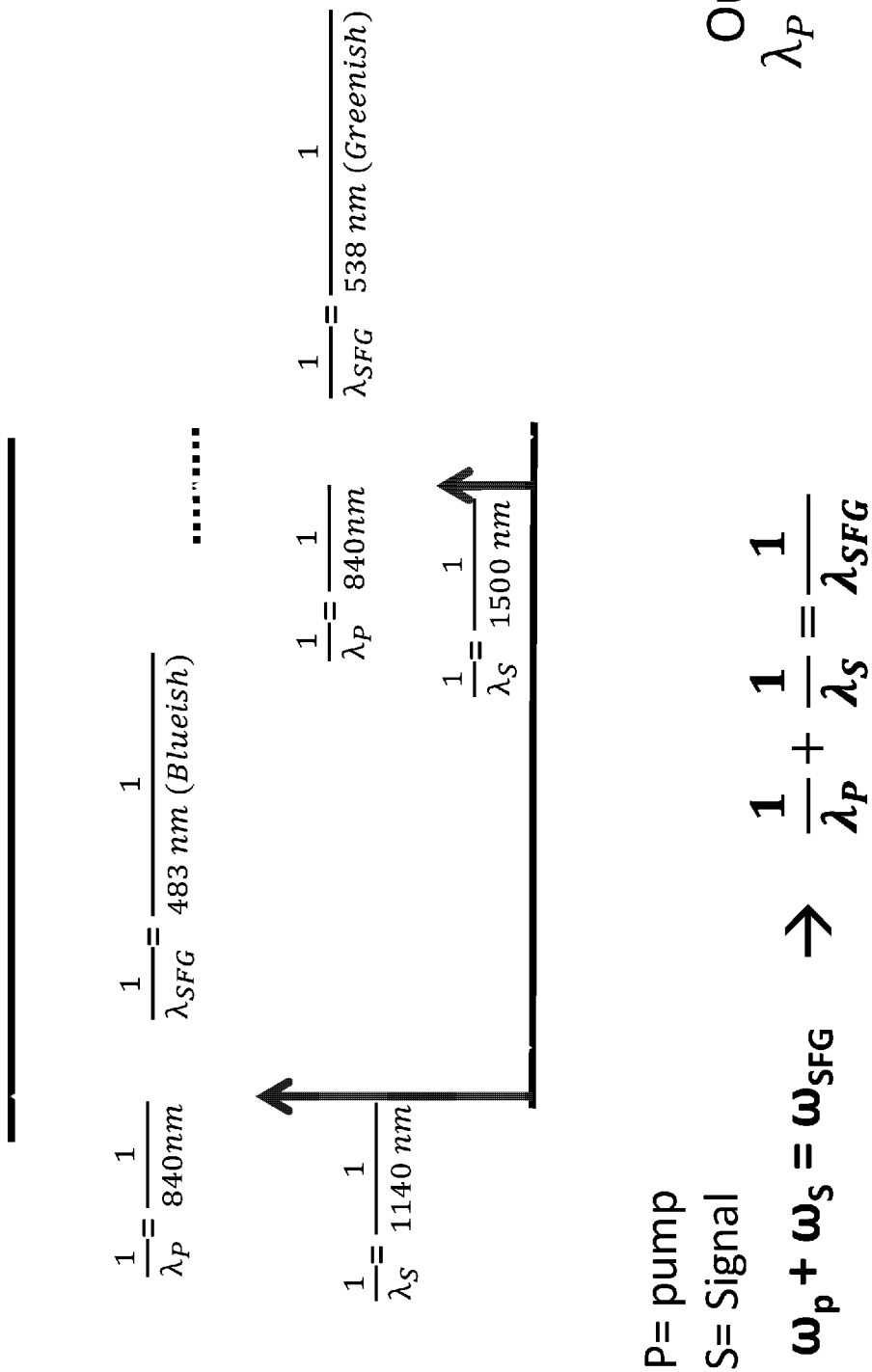
FIG. 70 is an energy level diagram showing how the different island configurations of FIG. 69 can be used with an 840 nm pump beam to selectively generate output wavelengths of 483 nm (Blueish) and 538 nm (Greenish) by sum frequency generation (SFG).

By combining both island configurations in a single frequency conversion device, different colours can be generated. For example, using a pump beam with wavelength of 840 nm, the two different configurations will generate sum frequencies corresponding to wavelengths of 483 nm (Blueish) and 538 nm (Greenish), respectively, as shown schematically in the energy level diagram of FIG. 70. It will be apparent to those skilled in the art that desired colour combinations can be selectively generated from different input wavelengths by corresponding selection of pump beam wavelength and different island configurations.

Many modifications will be apparent to those skilled in the art without departing from the scope of the present invention.

What is claimed is:

1. A frequency conversion device, including a source of a pump beam of electromagnetic radiation of a first wavelength, and an array of mutually spaced semiconductor islands composed of at least one III-V semiconductor compound, individual semiconductor islands of the array configured to respond to being simultaneously irradiated by the pump beam of electromagnetic radiation of the first wavelength and electromagnetic radiation of a second wavelength by emitting electromagnetic radiation of a third wavelength different to the first and second wavelengths by at least one of a sum frequency generation process and a difference frequency generation process; wherein the semiconductor islands are supported by a transparent support such that the support is transparent to radiation of the third wavelength, wherein at least the radiation of the third wavelength passes through the transparent support.

2. The frequency conversion device of claim 1, wherein the electromagnetic radiation of the second wavelength is infrared radiation, and the radiation of the third wavelength is visible light.

3. The frequency conversion device of claim 1, wherein the pump beam is directed along a plane containing the array of semiconductor islands.

4. The frequency conversion device of claim 3, including a waveguide structure to confine the pump beam within the plane containing the array of semiconductor islands.

5. The frequency conversion device of claim 1, wherein a portion of the pump beam is transmitted through the array of semiconductor islands, and the frequency conversion device includes a filter to remove the portion and to pass the electromagnetic radiation of the third wavelength.

6. The frequency conversion device of claim 1, wherein the frequency conversion device is transparent to visible light to enable vision through the frequency conversion device.

7. The frequency conversion device of claim 1, wherein the semiconductor islands are configured such that the electromagnetic radiation of a third wavelength is emitted in a forward direction.

8. The frequency conversion device of claim 1, wherein the semiconductor islands include groups of semiconductor islands configured to resonate at respective different frequencies such that the pump beam of electromagnetic radiation of the first wavelength incident upon the semiconductor islands and electromagnetic radiation of different second wavelengths incident upon the semiconductor islands cause them to emit electromagnetic radiation of respective third wavelengths different to the respective second wavelengths by at least one of a sum frequency generation process and a difference frequency generation process.

9. The frequency conversion device of claim 8, wherein the second wavelengths are in an infrared region of the electromagnetic spectrum, and the third wavelengths are in a visible region of the electromagnetic spectrum such that the different second wavelengths incident upon the groups of semiconductor islands cause them to emit visible light of respective different colours.

10. The frequency conversion device of claim 1, wherein the semiconductor islands are at least partially embedded in the transparent support.

11. The frequency conversion device of claim 1, wherein the transparent support includes a transparent substrate attached to a layer of a transparent material in which the semiconductor islands are at least partially embedded.

12. The frequency conversion device of claim 11, wherein the transparent substrate and the transparent material are both transparent to radiation of the first wavelength and to radiation of the second wavelength and to radiation of the third wavelength.

13. The frequency conversion device of claim 11, wherein the refractive index of the transparent substrate is equal to the refractive index of the transparent material.

14. The frequency conversion device of claim 11, wherein the refractive index of the transparent substrate is different from the refractive index of the transparent material.

15. The frequency conversion device of claim 11, wherein the transparent substrate is a glass or $MgF_2$ or $BaF_2$ and the transparent material is a polymer.

16. The frequency conversion device of claim 1, wherein the semiconductor islands are in the form of cylinders with spatial dimensions of the order of hundreds of nm.

17. The frequency conversion device of claim 1, wherein signal radiation of the second wavelength is reflected or emitted from one or more objects, and the frequency conversion device includes focusing elements configured to focus at least the radiation of the third wavelength to form a two-dimensional image of the one or more objects.

18. A night vision device including the frequency conversion device of claim 1.

19. The frequency conversion device of claim 1, wherein the semiconductor islands are configured to support Mie-type resonances at the first wavelength and/or at the second wavelength and/or at the third wavelength.

20. A process for producing a frequency conversion device, including the steps of:
forming, on a substrate, an array of mutually spaced semiconductor islands composed of at least one III-V semiconductor compound, individual semiconductor islands of the array configured to respond to being simultaneously irradiated by a pump beam of radiation of a first wavelength and signal radiation of a second wavelength by emitting radiation of a third wavelength different to the first and second wavelengths by a sum frequency generation or a difference frequency generation process, wherein the substrate is opaque to electromagnetic radiation of the third wavelength; and
attaching the semiconductor islands to a support that is transparent to radiation of the second wavelength to provide a frequency conversion device wherein the array of mutually spaced semiconductor islands is supported by the transparent support so that radiation of the first and second wavelengths incident upon the frequency conversion device causes the frequency conversion device to emit radiation of the third wavelength, and at least the radiation of the third wavelength passes through the transparent support.

21. The process of claim 20, including removing the substrate from the semiconductor islands.

22. The process of claim 20, wherein the semiconductor islands are at least partially embedded in the transparent support.

23. The process of claim 20, wherein the transparent support includes a transparent substrate attached to a layer of a transparent material in which the semiconductor islands are at least partially embedded.

24. The process of claim 23, wherein the transparent substrate is a glass or $MgF_2$ or $BaF_2$ substrate, and the transparent material is a polymer.

25. The process of claim 20, including configuring the semiconductor islands to support Mie resonances at the first and/or second and/or third wavelengths.

26. A frequency conversion process, including simultaneously directing electromagnetic radiation of a first wavelength and signal radiation of a second wavelength onto an array of mutually spaced III-V compound semiconductor islands supported by a transparent support, individual semiconductor islands of the array responding to the electromagnetic radiation and the signal radiation by emitting radiation of a third wavelength different to the first and second wavelengths by a sum frequency generation or a difference frequency generation process; wherein at least the radiation of the third wavelength passes through the transparent support.

27. The frequency conversion process of claim 26, wherein the semiconductor islands are configured to support Mie-type resonances at the first wavelength and/or at the second wavelength and/or at the third wavelength.

* * * * *